US009135321B2

(12) United States Patent
Novik et al.

(10) Patent No.: US 9,135,321 B2
(45) Date of Patent: Sep. 15, 2015

(54) SYNCHRONIZATION INFRASTRUCTURE FOR NETWORKED DEVICES, APPLICATIONS AND SERVICES IN A LOOSELY COUPLED MULTI-MASTER SYNCHRONIZATION ENVIRONMENT

(75) Inventors: Lev Novik, Bellevue, WA (US); Siva Muhunthan, Kirkland, WA (US); Moe Khosravy, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 748 days.

(21) Appl. No.: 12/026,999

(22) Filed: Feb. 6, 2008

(65) Prior Publication Data

US 2009/0198702 A1    Aug. 6, 2009

(51) Int. Cl.
G06F 7/00       (2006.01)
G06F 17/30      (2006.01)

(52) U.S. Cl.
CPC .... *G06F 17/30575* (2013.01); *G06F 17/30174* (2013.01)

(58) Field of Classification Search
USPC ............................................. 707/999.01, 620
See application file for complete search history.

(56) References Cited

U.S. PATENT DOCUMENTS

| 6,460,051 | B1 * | 10/2002 | LaRue et al. ............. 707/999.01 |
| 6,560,655 | B1 | 5/2003 | Grambihler |
| 6,687,878 | B1 | 2/2004 | Eintracht |
| 7,085,904 | B2 * | 8/2006 | Mizuno et al. ......... 707/999.204 |
| 7,162,543 | B2 | 1/2007 | Fischer |
| 7,275,105 | B2 | 9/2007 | Bloch |
| 7,707,182 | B1 * | 4/2010 | Kee et al. ...................... 707/638 |
| 2005/0044187 | A1 | 2/2005 | Jhaveri |
| 2006/0206583 | A1 | 9/2006 | Hill |
| 2006/0215569 | A1 * | 9/2006 | Khosravy et al. ............. 370/241 |
| 2007/0078950 | A1 | 4/2007 | Hopkins |
| 2007/0174487 | A1 | 7/2007 | Busey |
| 2007/0244897 | A1 * | 10/2007 | Voskuil et al. .................... 707/9 |
| 2007/0255617 | A1 | 11/2007 | Maurone |
| 2007/0255854 | A1 | 11/2007 | Khosravy |
| 2008/0176536 | A1 * | 7/2008 | Galluzzo et al. ........... 455/414.1 |
| 2008/0222630 | A1 * | 9/2008 | Taylor et al. .................. 707/102 |
| 2009/0043867 | A1 * | 2/2009 | Sharp et al. ................... 709/218 |

OTHER PUBLICATIONS

"Microsoft Synchronization Services for ADO.NET Orcas Beta1 release", Microsoft download Center, http://www.microsoft.com/downloads/details.aspx?FamilyId=75FEF59F-1B5E-49BC-A21A-9EF4F34DE6FC&displaylang=en, last accessed Nov. 21, 2007, 2 pages.

(Continued)

*Primary Examiner* — Hosain Alam
*Assistant Examiner* — Jieying Tang
(74) *Attorney, Agent, or Firm* — Sunah Lee; Kate Drakos; Micky Minhas

(57) ABSTRACT

The subject disclosure relates to an efficient multi-master synchronization infrastructure is provided enabling loosely coupled networked client and server devices, applications and services to efficiently convey and receive synchronization knowledge across interconnecting network(s). A set of synchronization methods and standardized interfaces are also provided that enable rich offline application experiences and collaboration among devices, applications and services predicated on the efficient synchronization infrastructure.

19 Claims, 18 Drawing Sheets

(56) References Cited

OTHER PUBLICATIONS

Microsoft Corp., "Introduction to Occasionally Connected Applications using Sync Services for ADO.NET", http://msdn2.microsoft.com/en-us/sync/bb887608.aspx, last accessed on Nov. 21, 2007, 9 pages.

Campbell, David, et al., "The Microsoft Data Platform", SIGMOD '07, Jun. 12-14, 2007, Beijing, China, 8 pages.

Microsoft Corporation, "Microsoft SQL Server 2008, Application Development Revolutionizing the development of database applications", http://download.microsoft.com/download/c/8/4/c8470f54-d6d2-423d-8e5b-95ca4a90149a/SQL%20Server%202008%20-Application%20Development%Datasheet.pdf, last viewed 2007, 2 pages.

\* cited by examiner

SYNCHRONIZATION INFRASTRUCTURE FOR NETWORKED DEVICES, APPLICATIONS AND SERVICES IN A LOOSELY COUPLED MULTI-MASTER SYNCHRONIZATION ENVIRONMENT

TECHNICAL FIELD

The subject disclosure relates to an efficient multi-master synchronization infrastructure with standardized REST based interfaces that enables rich offline application experiences.

BACKGROUND

The popularity of mobile computing and networked communications devices has created a corresponding wish for the ability to deliver and receive information whenever users want from any of their disparate devices. Put simply, users want ubiquitous access to information and applications from a variety of devices, wherever, whenever, and whatever the devices' capabilities, and in addition, users want to be able to access and update such information on the fly, they want guarantees that the data is as correct and up to date as can be, and they do not wish to pre-configure or subsequently guarantee that their devices will connect via any particular network topology.

Conventionally, distributed data systems have attempted to have devices and objects share replicas of data with one another based upon a static setup among devices. For instance, music sharing systems may synchronize music between a PC, a Cell phone, a gaming console and an MP3 player. Email data may be synchronized among a work server, a client PC, and a portable email device. However, today, to the extent such devices synchronize a set of common information with each other, the synchronization takes place according to a static setup among the devices. Yet, a static setup is inflexible by definition. When these devices become disconnected frequently or intermittently, i.e., when they are loosely coupled such that they may become disconnected from communicating with each other, e.g., when a cell phone is in a tunnel, or when the number of devices to be synchronized is dynamic, it becomes desirable to have a topology independent way for the devices to determine what changes each other device needs when they re-connect to one another, or as they join the network.

Today, as shown in FIG. 1, there are various examples where a master node 100 synchronizes in a dedicated manner with a client node 110, such as when an email server synchronizes with an email client. Due to the dedicated synchronization between the two devices, the information 102 needed to synchronize between the two devices can be tracked by the master node 100. Such information 102 can also optionally be tracked by client node 110 as well, however, when the connection between master node 100 and client node 110 becomes disconnected at times, or when the number of synchronizing devices can suddenly increase or decrease, tracking the necessary information of the common information that each device needs across all of those devices becomes a difficult problem.

Current solutions often base their synchronization semantics solely on clocks or logical watermarks for a specific node (e.g., the email server), as opposed to any node. These systems can work well in cases of a single connecting node or master. However, they run into problems when the topology or pattern in which the nodes connect can change unpredictably.

Other systems build proprietary synchronization models for specific kinds of data objects, tracking an enormous amount of primitive metadata specific to the data format across the devices in order to handle the problem. For instance, to synchronize objects of a particular Word processing document format, a lot of overhead and complexity goes into representing a document and its fundamental primitives as they change over time, and representing that information efficiently to other devices wishing to synchronize according to a common set of Word processing documents. In addition to such systems being expensive and complex to build and non-extendible due to their implementation of a custom data format, such systems are inherently unscalable due to the large amounts of metadata that must be generated, analyzed and tracked.

In addition, such solutions apply only to the one specific domain, e.g., Word processing documents. When synchronization objects of all kinds are considered, e.g., pictures, videos, emails, documents, database stores, etc., one can see that implementing custom synchronization solutions based on each object type for tracking evolution of such objects across all devices in a multi-master environment is unworkable today. In this regard, such solutions inextricably link synchronization semantics with the data semantics. Thus, if the data semantics change, or evolve, such solutions fail to adapt the synchronization semantics correspondingly.

Thus, there is a need for node-independent synchronization knowledge when computers in a topology change the way they connect to each other or as the number of computers grows. For instance, with a media player, it might be desirable to synchronize among multiple computers and multiple websites. In most instances, most applications can only synchronize data between a few well-known endpoints (home PC and media player). As the device community evolves over time for a user of the media player application, however, the need for data synchronization flexibility for the music library utilized by the devices increases, thereby creating the need for a more robust system.

The need becomes even more complex when one considers today's network data synchronization employed for servers and Web services. As mentioned, conventional synchronization systems presume a particular network topology, and when it comes to Web services, a consuming device is closely coupled with the server endpoint. While this can work effectively for a single consuming device that does not require a lot of processing and that does not generate a lot of network traffic, when a social networking service may have millions of users at a time, one can quickly see that the conventional model faces significant scaling issues. Such issues result because server resources are costly and can become scarce at times of high demand and because the data shared between disparate devices is often not a compact representation of what the device knows or wants to learn.

Thus, what is desired is an efficient set of commands among server and client devices, applications and services that can be used in a multi-master synchronization environment where network topology and connectivity among devices is unpredictable, where any device can synchronize with any other device to reduce overall load on particular server resources and network bandwidth caused by synchronizing devices. What is further desired is a synchronization layer "in the cloud" from the perspective of loosely coupled devices, applications and services, which enables synchronizing entities, in effect, to offload synchronization handling and processing when they become connected to a network.

In addition, conventional synchronization models also do not adequately address the off-line problem, i.e., today, when a device becomes disconnected, synchronizing applications on the device also fail because their synchronization capability depends on a connection to a corresponding server.

Or, even where an off-line experience is permitted, it is the result of custom application code that is predicated on knowledge of a preset network topology for the off-line experience. In other words, for an off-line email client that goes back on-line and attempts to synchronize, it can synchronize only because the email client explicitly knows about the server in advance. Extending the example further, if the email client has version 782 of the email data and the email server has version 789 of the email data, then the email client can obtain version 789 held at the server because the email client explicitly knows about the server by pre-configuration. Yet, if the email client comes into communicative contact with a laptop that also happens to have a copy of the exact same version 789 of the email data held by the server, today, the email client cannot synchronize with the laptop instead of the server as part of a flexible offline experience. Thus, the complexities of a multi-master synchronization environment have yet to be adequately addressed in connection with an off-line application experience.

The above-described deficiencies of today's synchronization systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In non-limiting embodiments, an efficient multi-master synchronization infrastructure is provided enabling loosely coupled networked client and server devices, applications and services to efficiently convey and receive synchronization knowledge across interconnecting network(s). A set of synchronization methods and standardized interfaces are also provided that enable rich offline application experiences and collaboration among devices, applications and services predicated on the efficient synchronization infrastructure.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
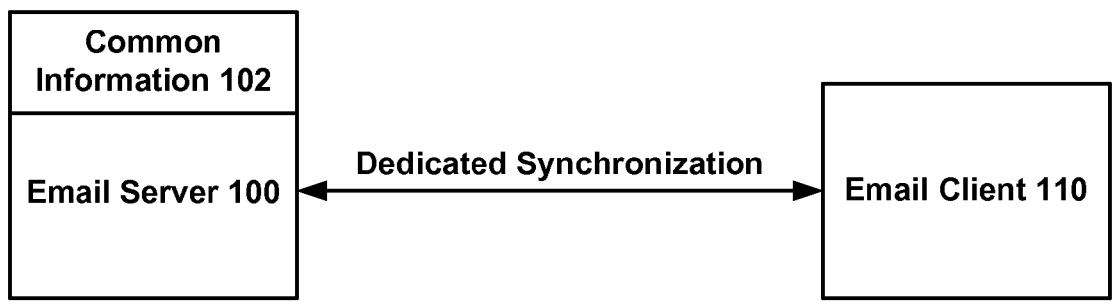
FIG. 1 illustrates a dedicated synchronization system that provides synchronization between two well defined endpoints of the system.

As discussed in the background, among other things, conventional systems that try to synchronize among many devices place undue burden on server resources and fail to adequately address the off-line synchronization experience in a multi-master synchronization environment. Accordingly, in various non-limiting embodiments, a synchronization communications infrastructure is provided as part of cloud network services that optimizes bandwidth and performance by efficiently enumerating and communicating changes to and from clients.

By allowing a connected client to pull relevant data of a given scope "down from the cloud," and then operate off-line on such data locally, e.g., in a cache, when the client becomes disconnected, or even while the client stays connected, there are a variety of resulting performance benefits. First, processing on the data locally at the client advantageously becomes faster because updates are made directly to a local store, e.g., a flash drive, hard disk, relational store, cache memory, etc. In addition, the amount and frequency of traffic chatter on the network owing to synchronization can be significantly reduced from conventional systems. In prior systems, when object A changes to object A', the change is reported to the server directly to update the object on the server. Then, when the object A' changes to object A", another change is reported and so on. However, if both the change to A' and the change to A" occur while the client application is off-line, then consistent with the synchronization knowledge framework adopted herein and described below, when the client becomes connected, the client can transfer only the minimum number of changes that the server needs to become up to date. Thus, irrelevant changes that occurred in the past can be avoided using the synchronization knowledge framework for multi-master synchronization environments.

The infrastructure further lowers the bar for developing rich Internet applications (RIAs) by integrating synchronization semantics at the service layer. The network communications can take place according to any Representational State Transfer (REST) based APIs, such as HTTP, SOAP, etc.

In addition to the client facing synchronization, the infrastructure further enables synchronization with a back end service by moving much synchronization complexity into a services layer, freeing the back end service from the complex and ongoing tasks of synchronization and conflict resolution among many synchronizing clients.

By specifying synchronization semantics independent of the data semantics, which can represent any object, devices can request and convey knowledge and come and go on the network as they please, thereby reducing dependency on other particular devices, and greatly simplifying the development of rich, offline experiences with data in the cloud for a multi-master synchronization system. In effect, where direct connections do not exist between devices, or where a direct connection is not preferable, a synchronization agent in the network is provided that can efficiently receive updated synchronization knowledge for a set of objects from a variety of devices, and also efficiently convey updated synchronization knowledge to any connected device as well. A standard set of methods, or commands, are thus provided for devices to efficiently convey and receive synchronization data of interest in a multi-master synchronization environment.

Figure 2:
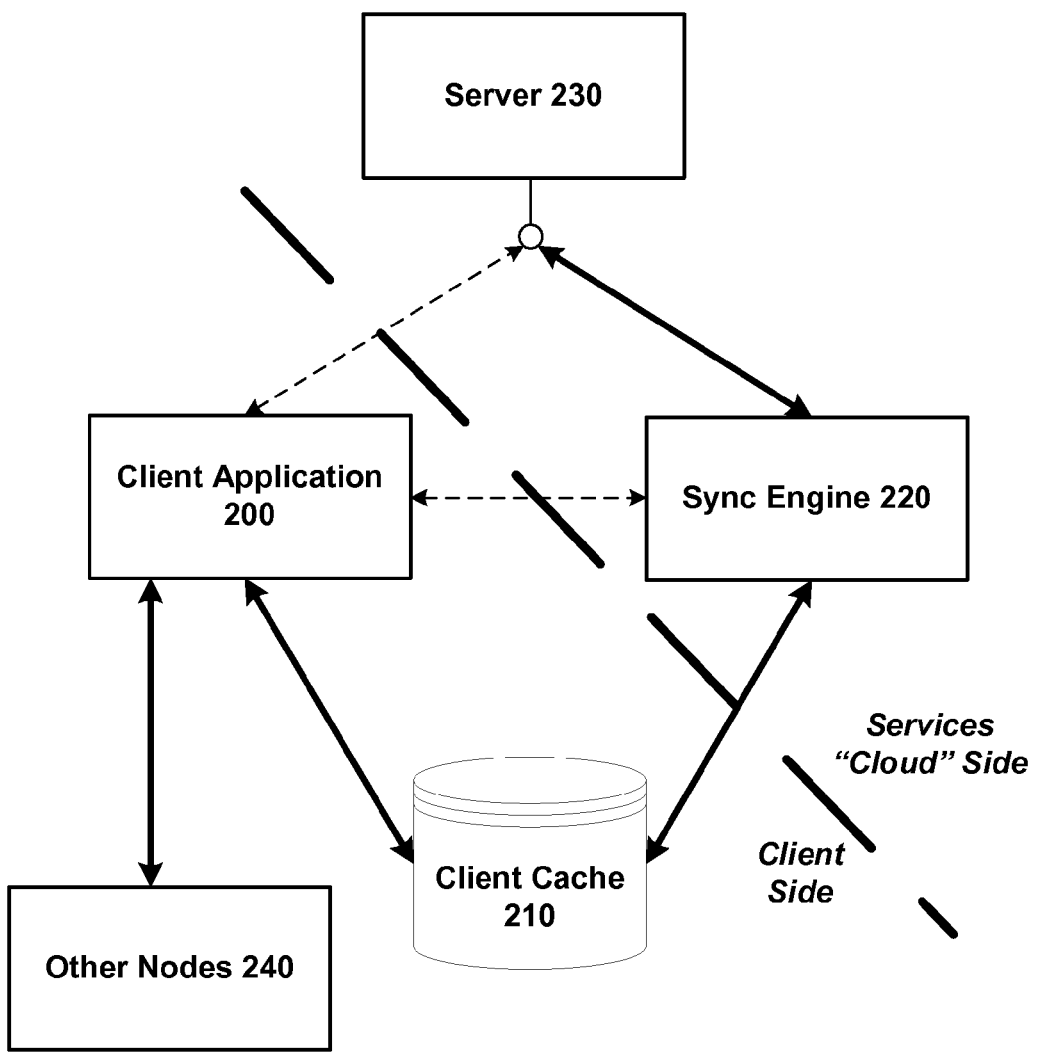
FIG. 2 illustrates a high level block diagram of an infrastructure for synchronization.

FIG. 2 illustrates a high level block diagram of an infrastructure for synchronization. As shown, rather than synchronizing in a dedicated manner between client application 200 with server 230 or directly with sync engine 220 as an intermediary between client 200 and server 230, a client application can direct that a set of objects be synchronized to client cache 210, or another accessible local store. The set of objects can then be updated locally, with changes being tracked locally so that at a later time, the changes can be conveyed to the server 230 or sync layer 220 as a group of changes, which can be represented efficiently, in contrast to a technique that sends changes one at a time, such as a dedicated conventional system. In addition, the client application can continue to synchronize with other nodes 240 and update the knowledge represented in client cache 210 any number of times prior to sharing the knowledge with the services in the cloud. The infrastructure thus enables off-line synchronization based on an efficient knowledge framework and enables further collaboration among other nodes 240 of the multi-master synchronization environment in the meantime, even where a connection to the server 230 is unavailable.

Figure 3:
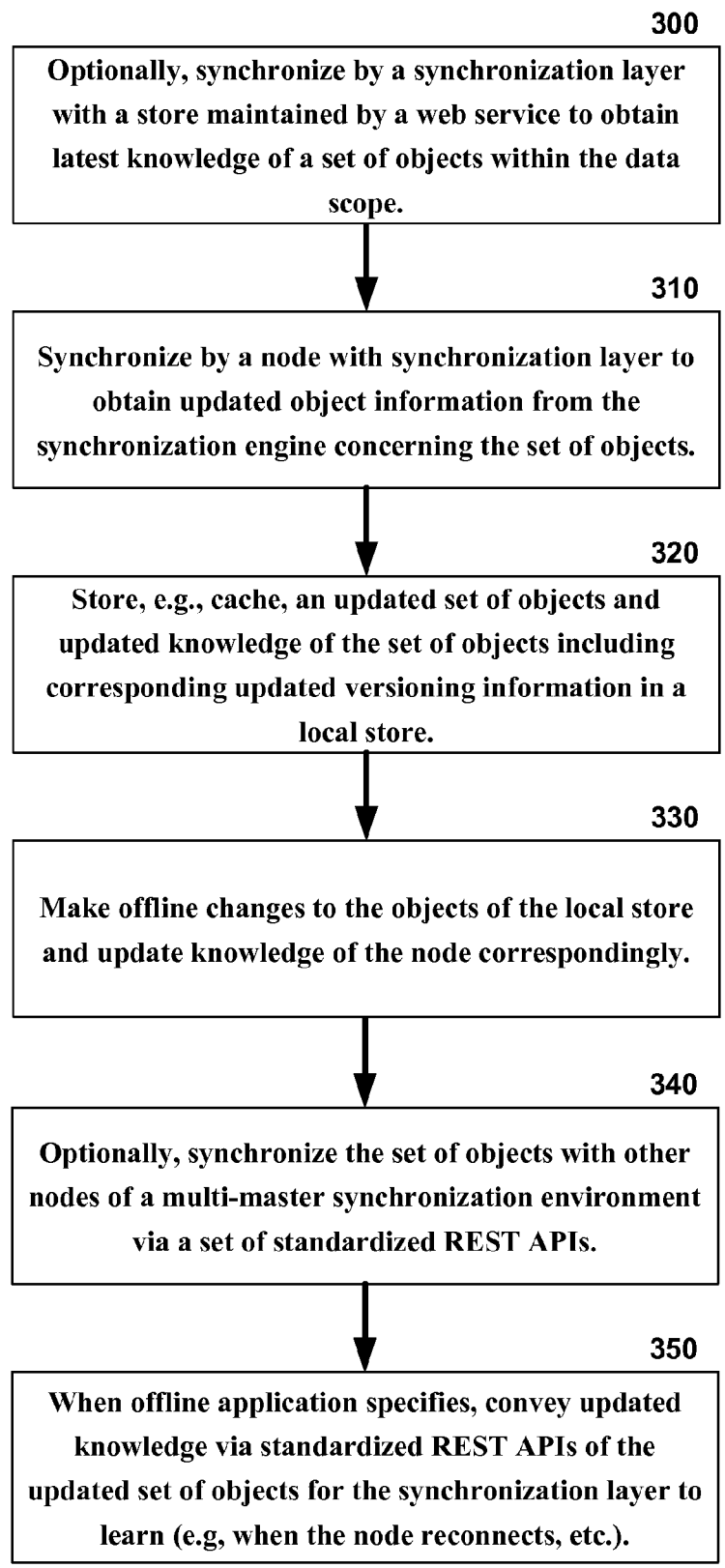
FIG. 3 is a flow diagram illustrating an exemplary, non-limiting process for synchronizing in the presence of nodes that connect and disconnect from a network.

FIG. 3 is a flow diagram illustrating an exemplary, non-limiting process for synchronizing in the presence of nodes that connect and disconnect from a network. At 300, optionally, a network synchronization object can synchronize with a store maintained by a web service to obtain latest knowledge of a set of objects within the data scope. At 310, a node can synchronize with synchronization layer to obtain updated object information from the synchronization engine concerning the set of objects.

At, 320, the node stores, e.g., caches, an updated set of objects and updated knowledge of the set of objects including corresponding updated versioning information. At 330, an offline application can make changes to the objects of the local store and to the knowledge of the node according to the knowledge framework described in more detail below.

Optionally, at 340, the set of objects can be synchronized with any other nodes of the multi-master synchronization environment via a set of standardized REST APIs, which may or may not have an independent connection to a service. At 350, since the offline application specifies when to synchronize again with the server when a connection is available, rich offline experiences can be built. For instance, when the offline application specifies, the updated knowledge can be conveyed, or just the changes made, via standardized REST APIs of the updated set of objects for the synchronization layer to learn (e.g, when the node reconnects, etc.). Since all nodes can use the same REST based APIs, knowledge can be shared around the multi-master network of nodes even where individual connections among nodes become disconnected at times.

Figure 4:
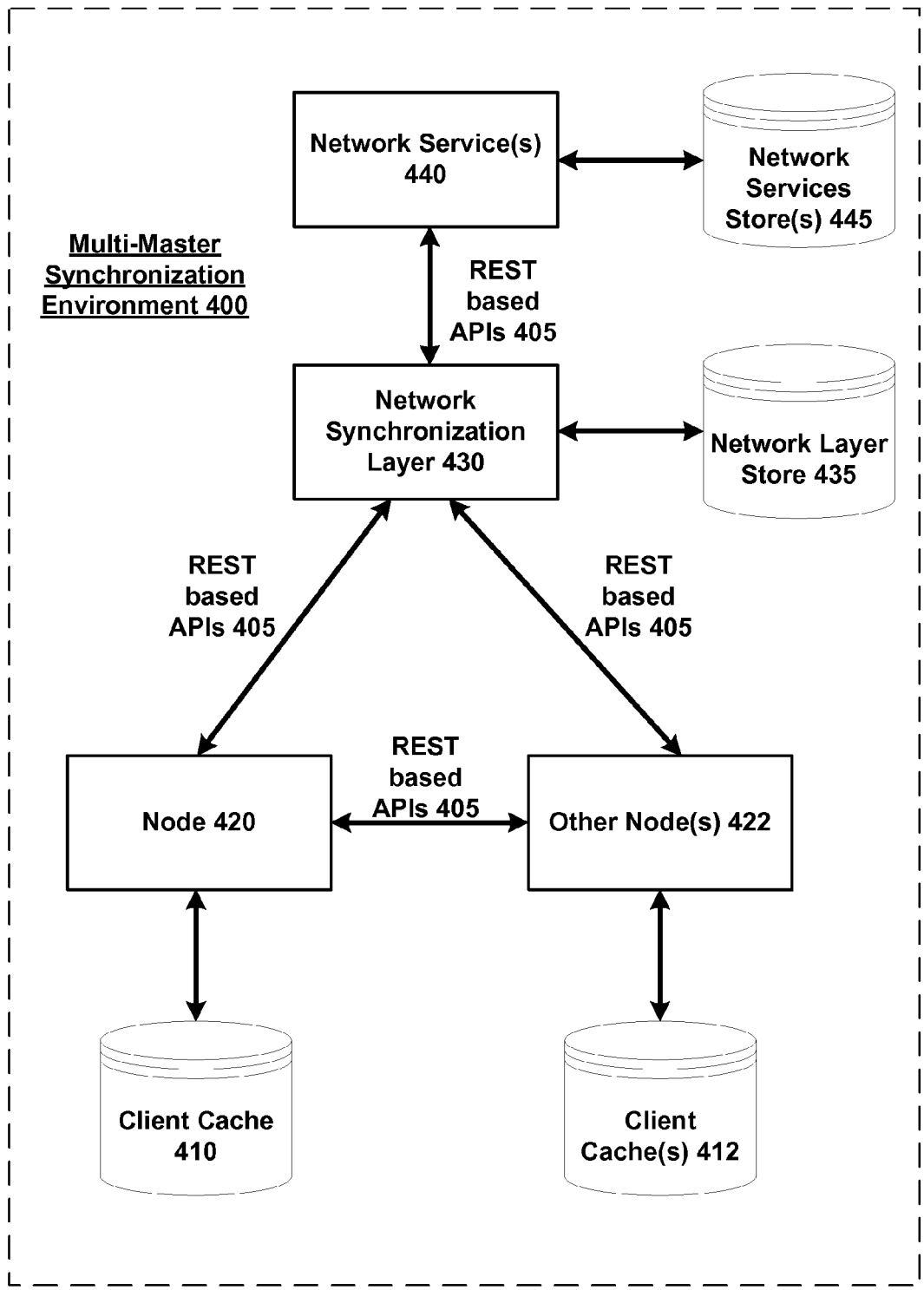
FIG. 4 is a block diagram of an efficient infrastructure for synchronizing with REST based APIs by a variety of nodes of a multi-master synchronization environment.

FIG. 4 is a block diagram of an efficient infrastructure for synchronizing with REST based APIs by a variety of nodes of a multi-master synchronization environment. FIGS. 2 and 3 illustrate representative aspects of applying knowledge to a local cache using a common synchronization language, i.e., knowledge, and common command structures that all nodes can use, enriching the ability to create offline synchronization experiences despite losses of connectivity. FIG. 4 in turn illustrates that the same set of REST based APIs, using a simple set of common commands predicated on the knowledge framework described below, can be used by all nodes of a multi-master synchronization environment 400 to achieve cross network synchronization and propagation of knowledge at minimal cost to implementing nodes. As mentioned, a set of nodes 420, 422, can implement local stores 410, 412, respectively, for purposes of synchronizing knowledge. Such nodes 420 and 422 synchronize using a set of REST based APIs 405.

Advantageously, the commands of the REST based APIs 405 can be used by any node to communicate with a network synchronization layer 430, which handles synchronization on behalf of network services 440. Rather than maintaining all synchronization information itself in network services stores 445, network services 440, can update such information periodically, or when needed, from network synchronization layer 430 and network layer store 435. Network synchronization layer 430 can also resolve conflicts among multiple synchronizing nodes 420, 422, thereby reducing load on network services 440, which have previously been required to implement custom synchronization solutions. Advantageously, instead, with the infrastructure provided herein, the same REST based API set 405 can be used by all nodes to communicate with respect to a set of objects being synchronized within a given data scope and based on present knowledge of the set of objects.

As a roadmap for what follows, first, an overview of some of the embodiments described herein is presented. Then, some supplemental context is given for a general mechanism for efficiently representing knowledge in multi-master data synchronization systems. Next, exemplary, non-limiting embodiments, methods, interfaces and features are discussed in more detail for efficiently requesting and conveying such knowledge among devices of such multi-master data synchronization systems, followed by representative, non-limiting, network and computing environments in which such embodiments can be implemented.

Efficient Knowledge Representation and Exchange

As a prelude to describing the synchronization infrastructure in a multi-master synchronization environment for network services in accordance with various non-limiting embodiments, in this section, an overview is presented of a general mechanism for efficiently representing knowledge in data synchronization systems. The general mechanism includes (1) an efficient exchange of knowledge between connected devices by requiring only the minimum data needed by a first node from a second node to be sent, (2) the ability to efficiently and correctly recognize disagreements over the state of data, i.e., conflicts, between a first node and a second node, (3) the ability to synchronize an arbitrary number of nodes and (4) the ability to synchronize any node via any other node, i.e., the ability to work in a peer to peer, multi-master synchronization environment.

With the general mechanism, any number of changes can be made to some information that is to be shared between the two devices. At any time they become connected, by exchanging their knowledge with one another, they become aware of at least the minimum amount of information needed to reconstruct what each other knows and doesn't know to facilitate of changes between the devices. It is noted that where more than two devices are involved, knowledge may be incomplete knowledge of a greater base of information to be shared, but as more knowledge is shared around the multiple devices, collective knowledge continues to be accrued by the devices as they connect to the other devices over time.

Advantageously, in various non-limiting embodiments, synchronization is performed for a set of devices, or, as described below, a subset of devices, all interested in maintaining the latest versions of a set of objects, but also allows such devices to come into connection and out of connection with the other objects of the set. Whenever a device comes back into connection with other device(s) of the set of devices via one or more networks, the device regains collective knowledge that is as up to date as the other device(s) represent with their collective knowledge. In this fashion, even loosely connected devices may come into and out of contact with a set of devices, and then relearn all the knowledge missed by coming into contact with any set of devices that possess the latest set of collective knowledge.

Figure 5:
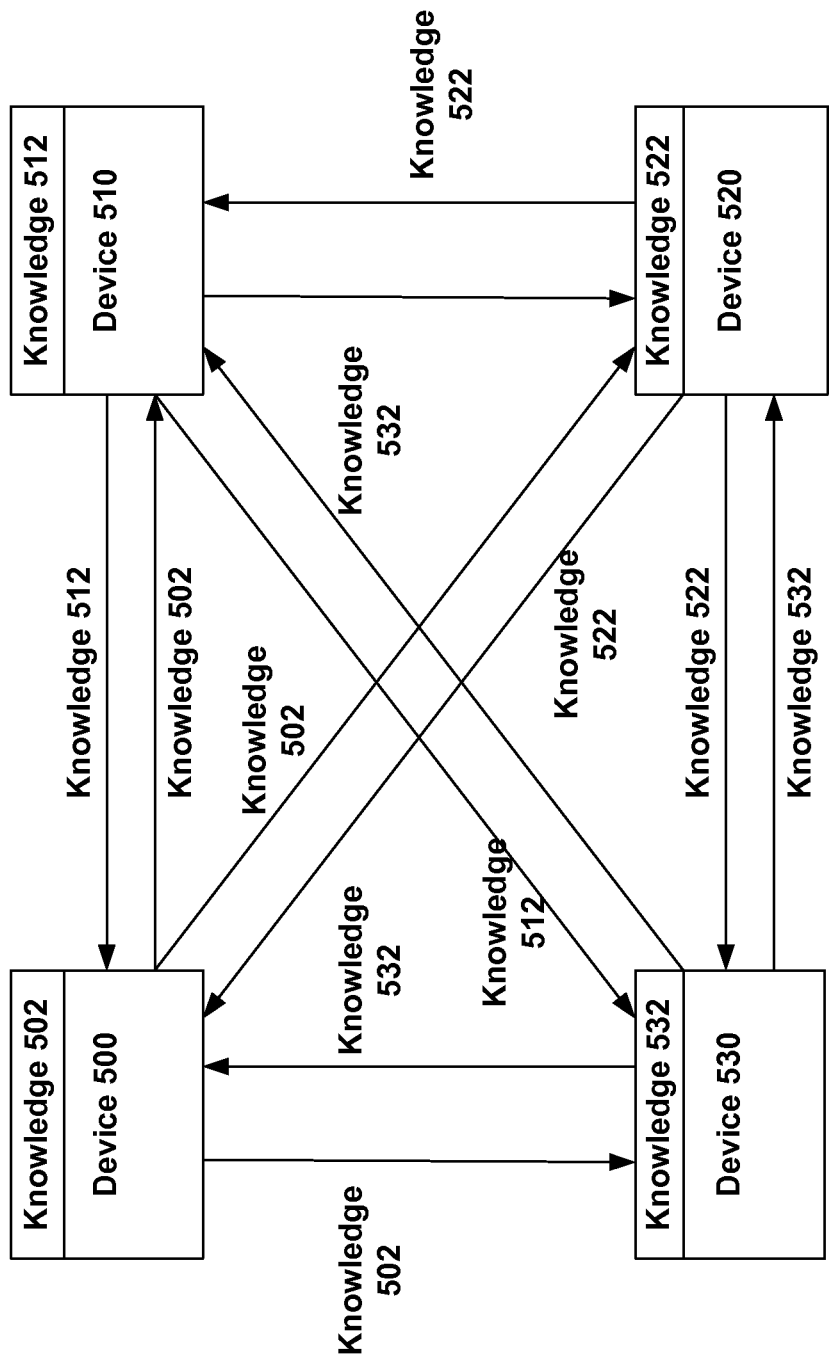
FIG. 5 illustrates exemplary non-limiting knowledge exchange between four nodes of a loosely connected network of nodes.

FIG. 5 illustrates that knowledge exchanges are generalizable, or scalable, to any number of devices. As shown, four devices 500, 510, 520 and 530 are shown with knowledge representations 502, 512, 522 and 532 that respectively indicate what each device knows and doesn't know about a set of common information to be shared across the devices.

Figure 6:
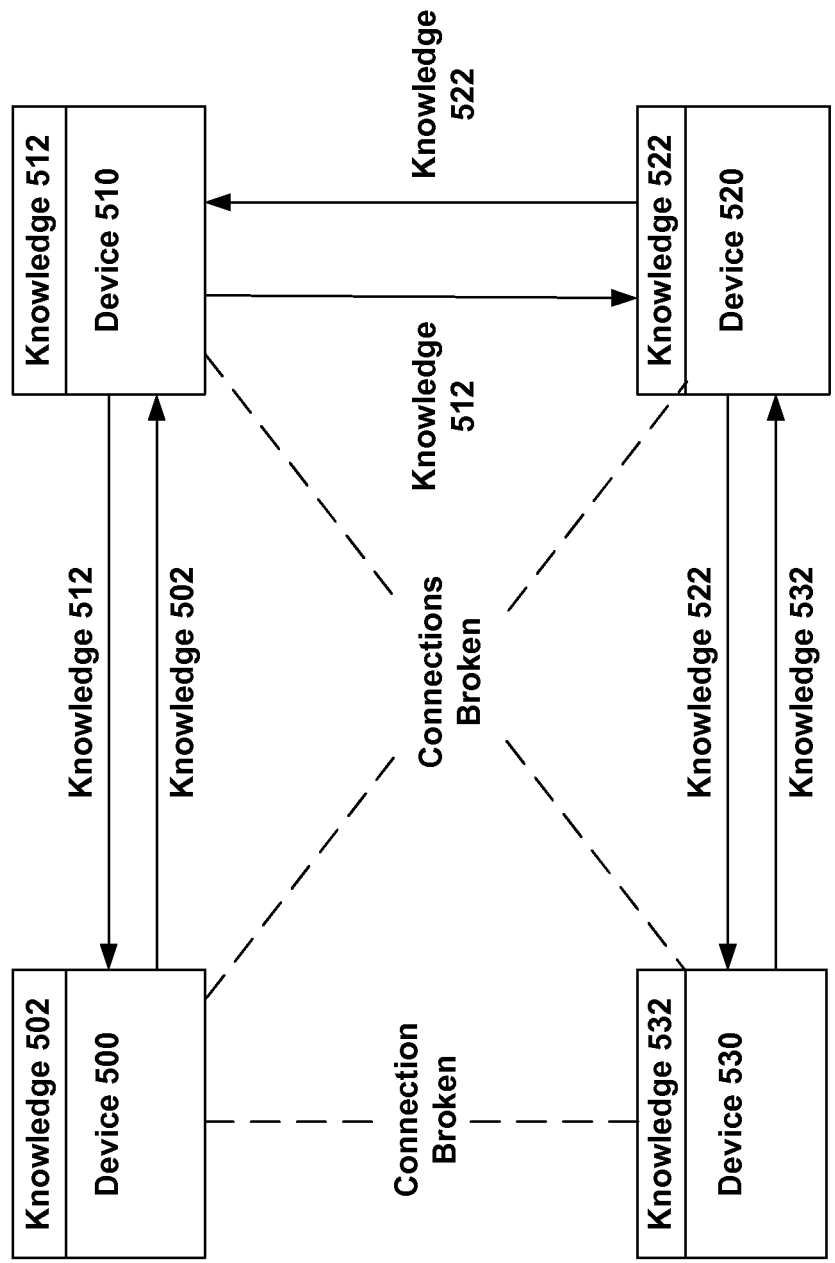
FIG. 6 illustrates exemplary non-limiting knowledge exchange between four nodes of a loosely connected network of nodes when some of the devices become disconnected from one another.

Advantageously, as shown by FIG. 6, even where connections in the network become disconnected, a complete set of knowledge can nonetheless be gained by all of the devices 500, 510, 520, and 530, as long as at least one connection directly or indirectly exists to the other devices. For instance, as shown, knowledge 532 of device 530 still reaches device 500 via the knowledge exchange with device 520, then via the knowledge exchange between device 520 and 510, and finally via the knowledge exchange between device 510 and 500.

With more devices sharing knowledge about common information to be shared, all of the devices benefit because knowledge exchange(s) in accordance with various non-limiting embodiments are agnostic about from which device collective knowledge comes. The devices each independently operate to try to gain as much knowledge about information to be shared among the devices from any of the other devices to which it is connected.

In exemplary non-limiting detail, a method is described in further detail for two nodes to engage in a conversation and at the end of the conversation to have equivalent knowledge for the concerned data set. The method is scalable beyond two nodes by creating a knowledge exchange capability for each new device entering the peer-to-peer network/multi-master environment.

Figure 7:
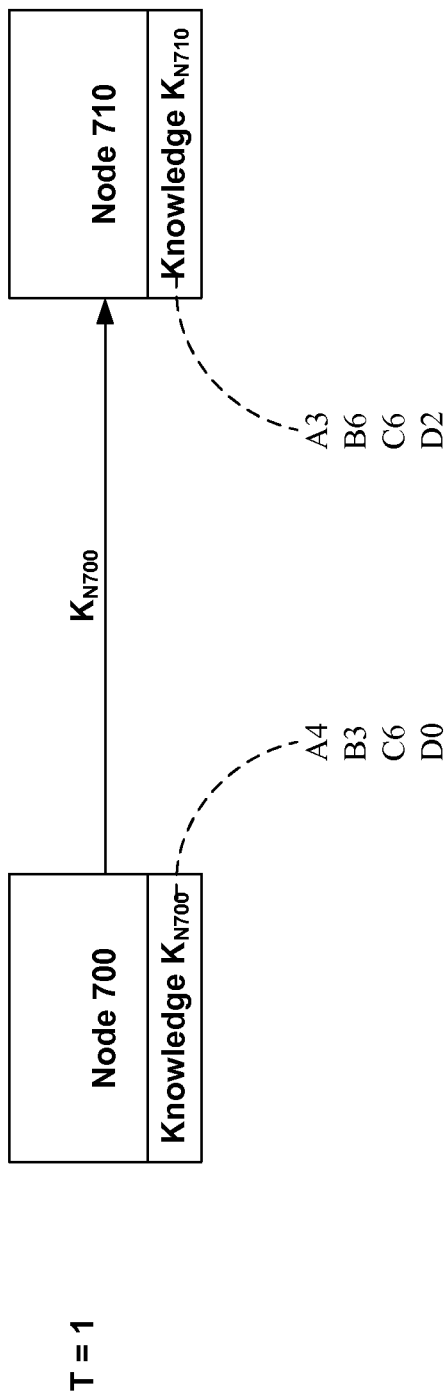
FIGS. 7, 8 and 9 illustrate exemplary knowledge exchange in the context of multiple objects shared among nodes of a network.

Thus, as shown in FIG. 7, node 700 of a peer-to-peer network having any number of nodes wants to exchange data with Node 710. Node A begins by requesting changes from Node 710 and in order to do so Node 700 sends its knowledge (represented as $K_{N700}$) to Node 710 as shown.

Knowledge of a device or node is represented by labeling each object to be shared among devices with a letter identifier, and then the trailing number represents the latest version for this object. For instance, $K_{N700}$ as shown in FIG. 7 includes objects A, B, C and D each to be synchronized between nodes 700 and 710, and the number following each of the objects represents the latest version of the object known on the device. For instance, knowledge $K_{N700}$ at a time t=1 includes the $5^{th}$ version of A, the $4^{th}$ version of B, the $7^{th}$ version of C, and the $1^{st}$ version of D, notated as A4, B3, C6, D0 in FIG. 7. In contrast, knowledge $K_{N710}$ of node 710 at a time t=1 may include the $4^{th}$ version of A, the $7^{th}$ version of B, the $7^{th}$ version of C, and the $3^{rd}$ version of D, notated as A3, B6, C6, D2 in FIG. 7.

Figure 8:
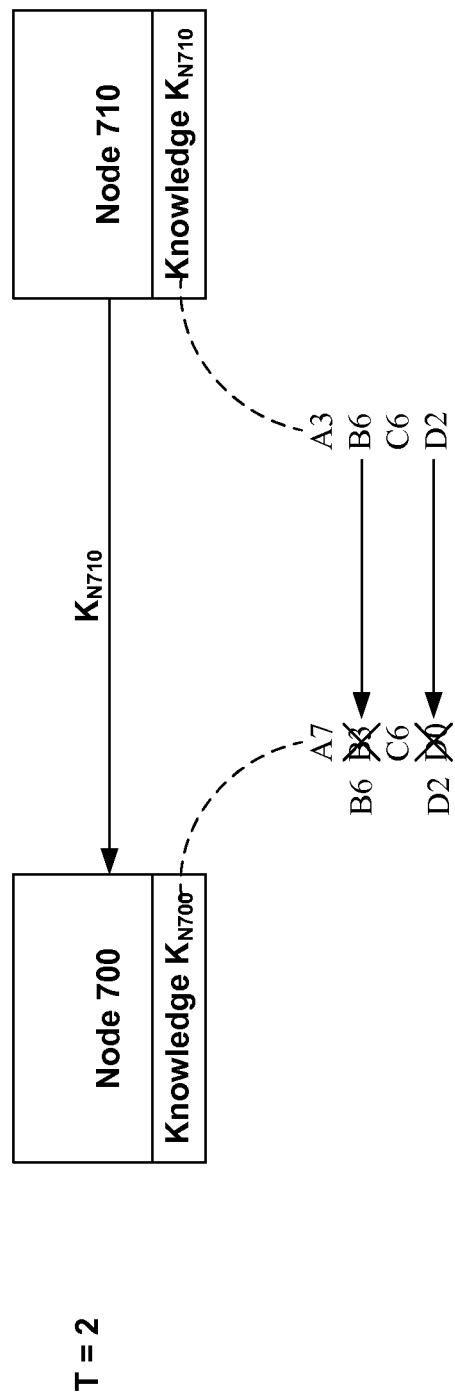

As shown in FIG. 8, at time T=2, node 710 compares knowledge $K_{N700}$ received from node 700 against its own knowledge $K_{N710}$ and determines what needs to be sent to node 700. In this example, as a result, node 710 will send node 700 the changes relating to B and D since node 700's knowledge of B3, D0 is behind node 710's knowledge of B6 and D2. When node 710 sends node 700 the changes between B6 and B3, and the changes between D2 and D0, it also sends along the latest version of knowledge $K_{N710}$ it has (reflecting whenever the last change on node 710 was made).

Figure 9:
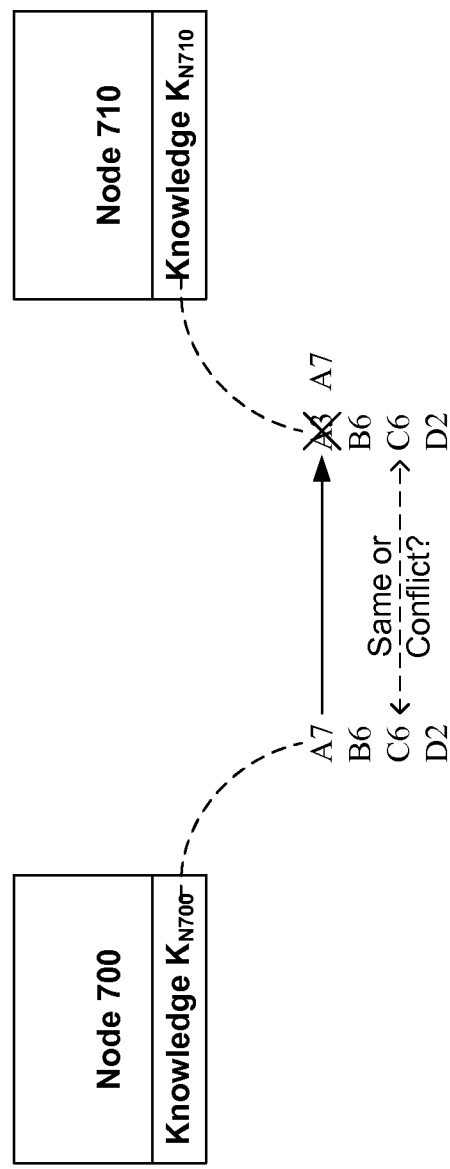

As shown in FIG. 9, representing time t=3, sending knowledge $K_{N710}$ to node 700 allows node 700 to detect conflicts (e.g., store them for later resolution) if it later finds out that both node 700 and node 710 made a change to an object while they were on the same version. This allows for autonomous updating, efficient enumeration, but also correct conflict detection when the nodes meet and exchange changes. For instance, in the example, if C6 is not the same object in both knowledge $K_{N710}$ and $K_{N710}$, e.g., if both independently evolved from C5 to C6, then which C6 is the correct C6 can be set aside for conflict resolution, e.g., according to pre-set policy resolution that befits the synchronization scenario and devices involved.

Figure 10:
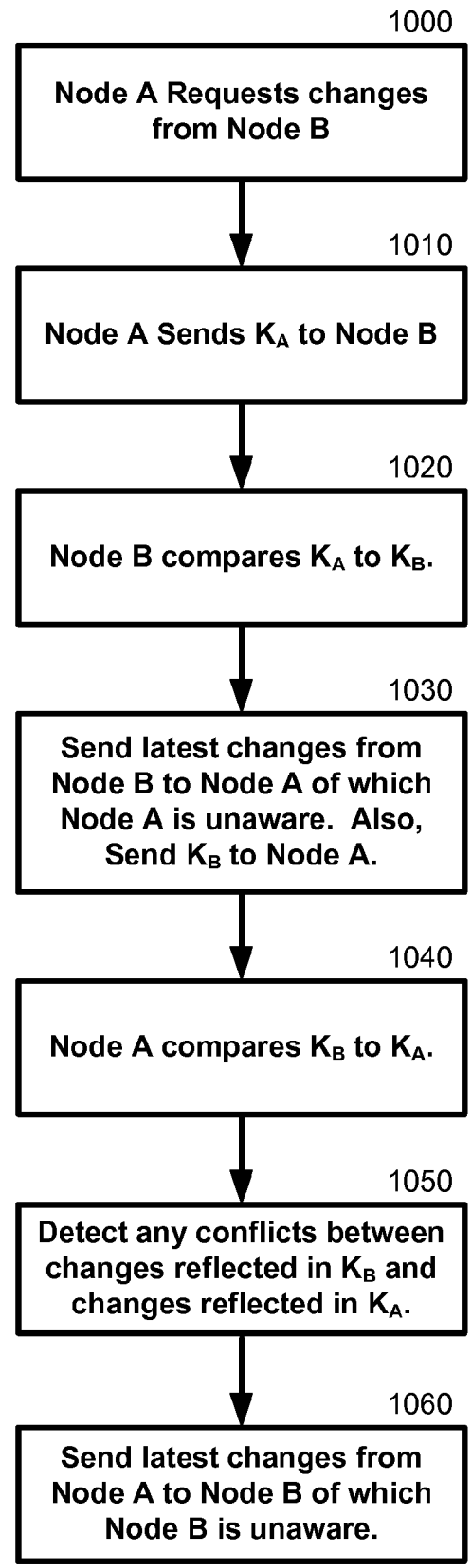
FIG. 10 is an exemplary non-limiting flow diagram illustrating the process for knowledge exchange in the context of multiple objects shared among nodes of a network.

An exemplary knowledge exchange process between any two nodes of a distributed multi-master synchronization environment using the above described general mechanism is shown in the flow diagram of FIG. 10. At 1000, node A requests synchronization with node B, thereby asking node B for changes node A does not know about. In order to equip node B, at 1010, node A sends its knowledge to node B. At 1020, node B compares the knowledge received from node A with its own knowledge to determine what changes node B knows about that should be sent to node A. At 1030, node B sends such changes to node A, and in addition, node B sends its knowledge to node A so that node A can perform a similar knowledge comparison at 1040.

At 1050, node A detects any potential conflicts between latest versions reflected in the knowledge of node B and latest versions reflected in the knowledge of node A, in the event that independent evolution of versions has occurred on node A and node B. Optionally, any conflict resolution policy may be applied to determine which node trumps the other node in the event of a conflict. At 1060, the latest changes from node A that are not possessed by node B are sent to node B. The conflict resolution policy will additionally dictate whether any changes are sent from node B to node A, or node A to node B, to maintain common information between the nodes. If independent versioning is OK, or desirable, no conflict resolution is another option.

Figure 11:
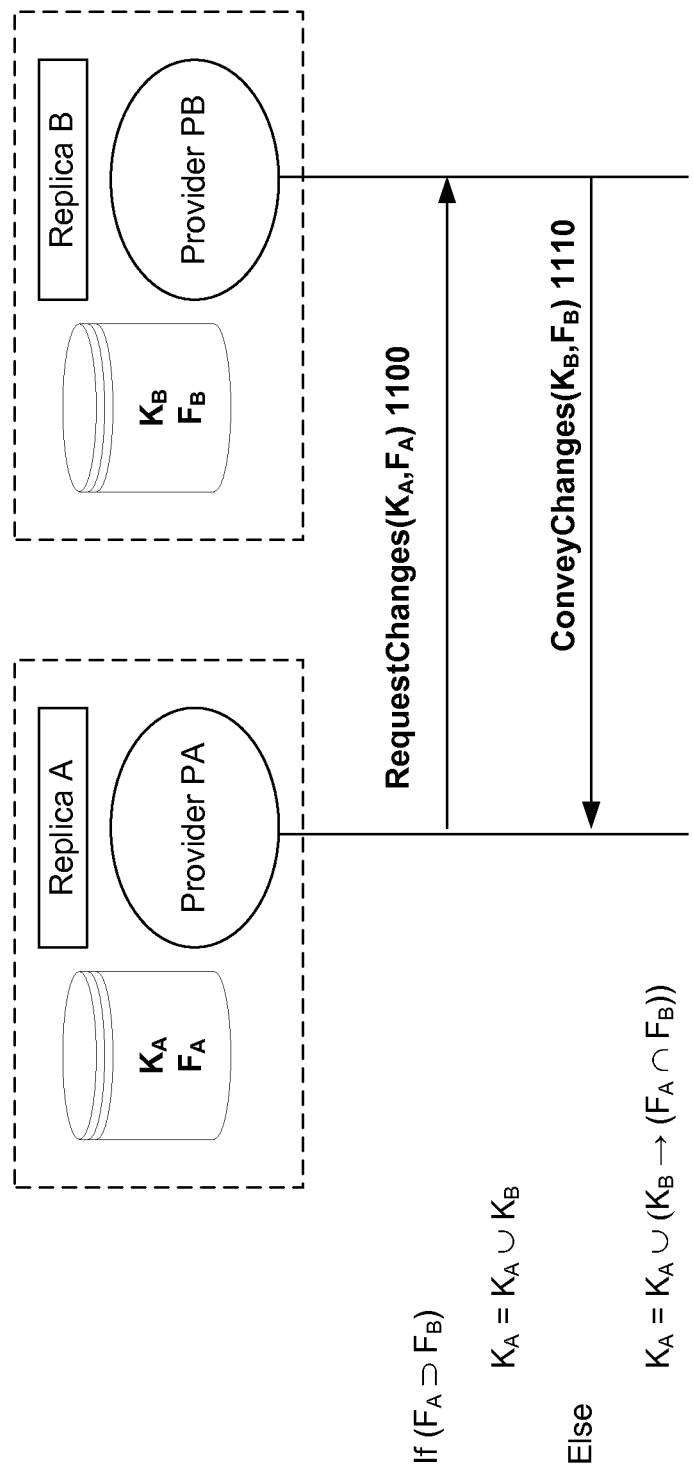
FIG. 11 is a general architecture illustrating the framework for requesting and conveying changes based on knowledge and partial knowledge.

FIG. 11 illustrates the generalized mechanism for exchanging knowledge when filtered knowledge is possible, i.e., where a subset of a node's knowledge is to be synchronized with one or more of the other nodes. As shown, each replica A and B has provider PA and provider PB, respectively. In this regard, each replica A and B maintains knowledge $K_A$ and $K_B$, respectively, and potentially also maintains filtered knowledge $F_A$ and $F_B$. Similar to the case with no subsetting, any of the replicas can request changes 1100 of another replica and receive changes 1110 in response to the other replica conveying changes. If the filtered knowledge $F_A$ and filtered knowledge $F_B$ are of the same scope, then as with the generalized knowledge exchange:

$$K_A = K_A \cup K_B$$

If the filtered knowledge $F_A$ and filtered knowledge $F_B$ are not of the same scope, then instead the knowledge is a function of existing knowledge plus the knowledge of the other replica as projected onto the intersection of their respective Filters $F_A$ and $F_B$, as follows:

$$K_A = K_A \cup (K_B \rightarrow (F_A \cap F_B))$$

Among other applications, an exemplary, non-limiting application for these types of filters is for filtering columns, or any change units of a synchronization framework. This is particularly applicable since column changes are not likely to be subject to move operations in the system. There are two considerations for this scenario worth noting: filter representation and knowledge consolidation.

With respect to filter representation, filter representation for the case of no move filters is as follows. Each filter is represented as a list of the change units contained within the filter. This representation provides a convenient means of representation as well as the ability to combine filters when necessary. The ability to combine filters is useful for consolidating knowledge.

With respect to knowledge consolidation, in order to keep knowledge in its most concise form the ability to consolidate knowledge must be maintained. In this regard, fragments of filtered knowledge can be consolidated so that knowledge can be maintained in its most compact form.

Considering the ability to combine filters, since filters can be represented as a set of change units, overlaps in filters can be reconciled by isolating the sets of change units that exist in both filters.

Also, since the vector for a filter applies to each of the individual change units within the filter, the combination of the filters can be performed by finding the combined vector for the change unit for each change unit in both filters. Then once all of the vectors are known, the change units that have a common vector are recombined into a new filter.

Accordingly, the notion of knowledge can be used to efficiently represent data for knowledge exchanges among multiple nodes of a multi-master synchronization network, any node of which may independently evolve common information, or subsets of common information, to be synchronized across the nodes. As described in more detail below, the above-described knowledge based framework is extendible to a multi-master synchronization environment including a network services layer for facilitating synchronization of data among disparate devices, which can go offline, via a common set of commands implemented as a set of standard RESTful synchronization interfaces.

Multimaster Synchronization Infrastructure Embodiments

As mentioned, in various non-limiting embodiment, an infrastructure is provided for Web services via multi-master sync extensions that also enable rich offline applications. A comprehensive synchronization platform is provided that enables developers to add synchronization capabilities to applications, services and devices in a multi-master synchronization environment including the ability to support off-line functionality. Based on a definition of synchronization knowledge described in more detail below, the infrastructure enables devices to synchronize any type of data, and using any protocol over any network. Advantageously, the infrastructure enables peer-to-peer synchronization between any endpoints (e.g. device to desktop, device to server, etc.) in an endpoint independent manner.

In one non-limiting embodiment, a set of methods are provided that integrate synchronization into RESTful web services, allowing for offline behavior that enables applications to act locally when disconnected, and synchronize globally with large numbers of other potentially disconnected devices, as the devices' connectivity comes and goes, in a multi-master synchronization environment.

For brief context, Representational State Transfer (REST) is a style of software architecture for distributed hypermedia systems, such as the World Wide Web. REST typically refers to a collection of network architecture principles that outline how resources are defined and addressed. The REST style is an abstraction of the architectural elements within a distributed hypermedia system. REST ignores the details of component implementation and protocol syntax in order to focus on the roles of components, the constraints upon their interaction with other components, and their interpretation of significant data elements. REST encompasses the fundamental constraints upon components, connectors, and data that define the basis of the Web architecture, and thus the essence of its behavior as a network-based application.

REST enables a shared understanding of data types with metadata, but also limits the scope of what is revealed to a standardized interface. REST components communicate by transferring a representation of a resource in a format matching one of an evolving set of standard data types, selected dynamically based on the capabilities or desires of the recipient and the nature of the resource. Whether the representation is in the same format as the raw source, or is derived from the source, remains hidden behind the interface. Among other things, REST thus gains the separation of concerns of the client-server style without the server scalability problem and allows information hiding through a generic interface to enable encapsulation and evolution of services. Systems that follow REST principles are often referred to as "RESTful." In this regard, in one aspect, embodiments advantageously use standardized REST based APIs to share synchronization knowledge, as described above, among any number of potentially offline devices and applications. This is achieved in an efficient manner by only sharing the minimum amount of knowledge required to bring other devices or stores up to date.

While data is increasingly "in the cloud" as part of network services, e.g., photo shares, social networking site data, travel itineraries, email, etc., with the synchronization communications infrastructure described herein, rich Internet applications (RIAs) can be built that do not depend on an "always on" network experience. Thus, a user can have anytime access to data, including access when not connected, e.g., when on an airplane and the antenna must be turned off and including seamless access when the user's device is encountering a spotty network, e.g., bad wireless. This is because, in either case, changes can be made to a previously synchronized local store on the device, e.g., to a local cache, which can then be propagated for update at the server or web service level later when the device encounters robust connectivity again. Predicated on the knowledge framework described herein, applications can define how that knowledge is synchronized upon reconnect by exercising commands of a minimal set of RESTful APIs described below.

Plus, in the meantime, the user's device can connect with other devices and synchronize with one another. Thus, if another device, e.g., the user's PC, can synchronize with the user's first device while it is disconnected, then the user's first device can learn the knowledge of the user's PC. The user's PC may even include partial or complete server knowledge due to a separate synchronization from a separate connection the user's PC has with the network. For instance, the user's first device may be a mobile phone, with a poor wireless connection, whereas the user's PC may be connected via a wired T1 line. In such case, even though the user's mobile phone is technically offline with respect to the network service, it can learn additional knowledge of interest from other devices in the multi-master synchronization environment via the same common set of RESTful API commands.

In addition, since on-line synchronization behavior inherently includes all of the downsides of network communications, which can be slow or spotty based on demand, the synchronization infrastructure also improve on-line behavior via local caching. By caching updates to a data store made by a device, such updates can be conveyed in the compact representation of metadata maintained by the knowledge framework described herein, representing only the minimum amount of information needed to indicate synchronization behavior (such as which updates need to be transmitted), thus using network resources more efficiently.

As a result, the user experience improves due to reduced latency associated with synchronization and the server itself benefits by reducing its load and requirements with respect to tracking many clients making updates to the same set of data. In this regard, the server itself becomes a consumer of the synchronization services provided by the common set of RESTful APIs. When the server requires updated data, the server can get knowledge from a synchronization engine operating on behalf of all of the devices making updates to the particular data being synchronized.

Figure 12:
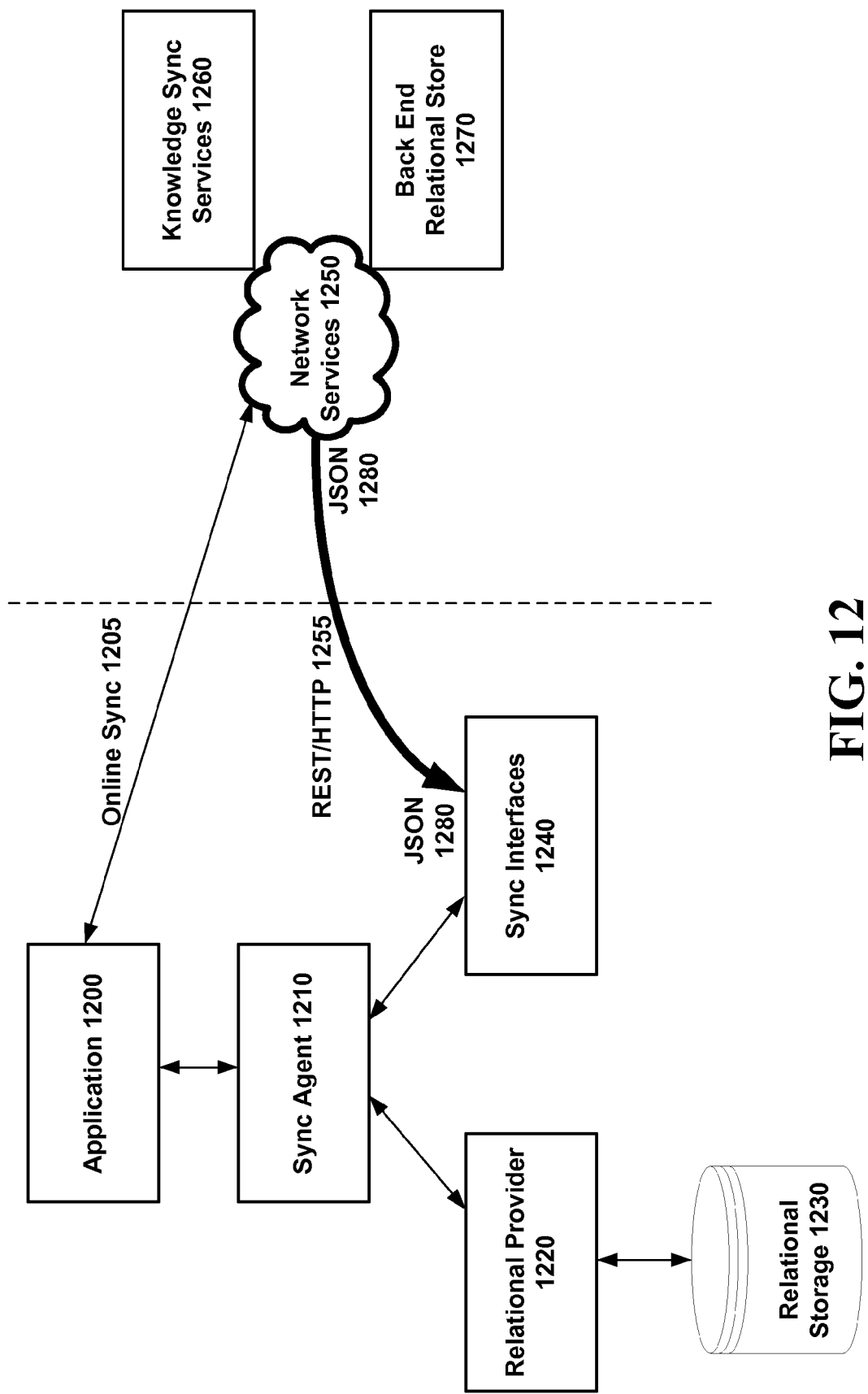
FIG. 12 is an exemplary, non-limiting block diagram illustrating the benefits from applying the multi-master synchronization methods in the context of an off-line application.

FIG. 12 is an exemplary, non-limiting block diagram illustrating the benefits from applying the multi-master synchronization methods in the context of an off-line application. Traditionally, an application 1200 would contain custom logic that presumes a direct communication with the service 1250 at issue for purposes of synchronizing directly and in a hardwired manner. While a knowledge exchange can also be performed directly, as described above and as shown generally at 1205, in one embodiment, network services 1250 include a knowledge synchronization services layer 1260 and a back end relational store 1270 for storing synchronization information. Store 1270 need not be a relational store, though typically a relational store is beneficial where storing large amounts of structured data.

Then, via a common set of methods understood by both the application side via a set of sync interfaces by provider 1240 and the services side by knowledge sync services 1260, namely a set of REST APIs 1255 (e.g., HTTP commands), which consume at the receiving side and send at the sending side in JSON format 1280, a set or a subset of objects of store 1270 can be downloaded to local storage for higher performance, reduced network chatter, and efficient communications, providing an overall better client application experience. The language of synchronization is thus separated from the services 1250 themselves and the client application 1200, except that both can issue commands that conveniently cause sync services 1260 on the services side and sync agent 1210 on the client side to efficiently synchronize according to the principles of the knowledge framework described above.

Thus, once a set of objects and knowledge of the set of objects is acquired from the network services 1250 via knowledge sync services 1260 and store 1270, sync agent 1210 handles the data received via sync interfaces 1240 and forms a local copy of the data, e.g., in client relational provider 1220 and corresponding relational storage 1230. As mentioned, caching principles work well where the set of objects can be accommodated. Thus, at this point, the application 1200 can effectively go offline, issue commands to sync agent 1210, which translates those commands to action, e.g., modifying the data of the set of objects, and thereby modifying knowledge of the set of objects. After many modifications, the application 1200 can direct the server to learn about the changes made by the client application 1200. In addition, as mentioned, at any time, the application 1200 can synchronize with any other application or node (not shown) in the multi-master synchronization environment by using the same knowledge exchange principles and methods.

Figure 13:
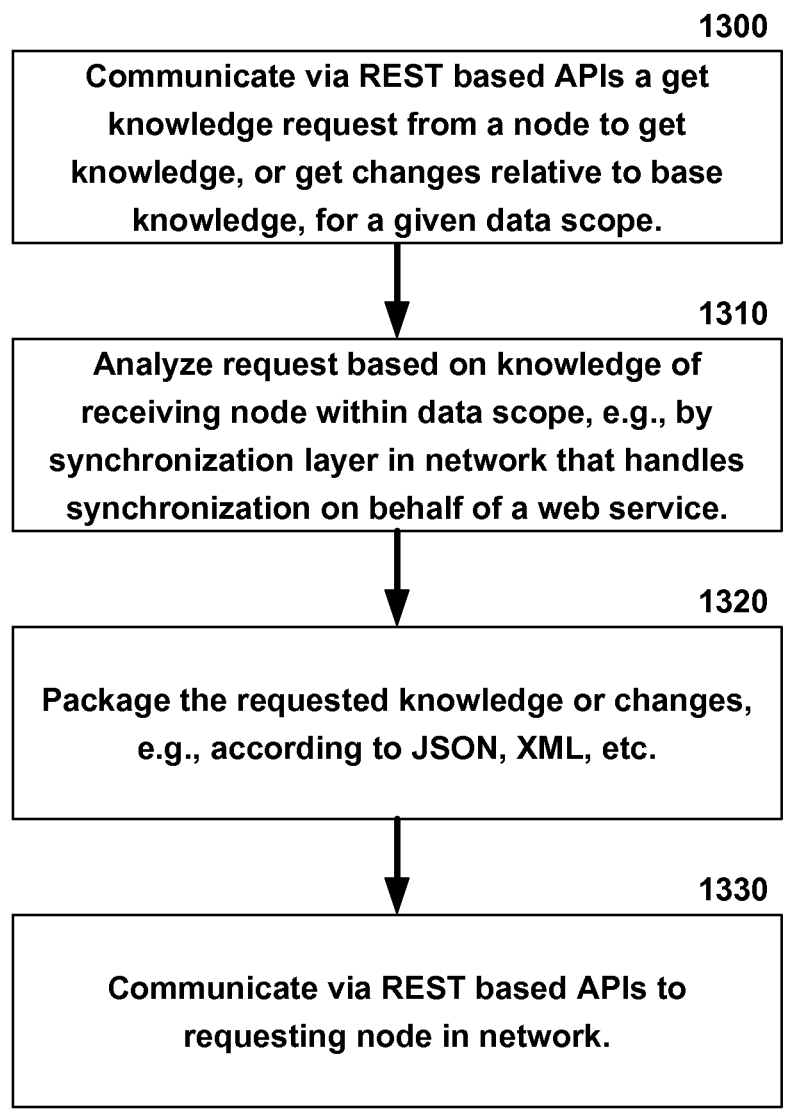
FIG. 13 is a first flow diagram illustrating an exemplary, non-limiting process for synchronizing in a multi-master synchronization environment via a set of REST based APIs.

FIG. 13 is a flow diagram illustrating an exemplary, non-limiting process for synchronizing in a multi-master synchronization environment via a set of REST based APIs. At 1300, a node communicates, via REST based APIs, a get knowledge request to get knowledge, or get changes relative to base knowledge, for a given data scope. At 1310, the request is analyzed based on knowledge possessed by the receiving node of the set of objects within data scope, e.g., by synchronization layer in network that handles synchronization on behalf of a web service. Then, at 1320, the requested knowledge or changes is packaged, e.g., according to JSON, XML, etc. Next, at 1330, the requested knowledge is communicated via REST based APIs to the requesting node in the network.

Figure 14:
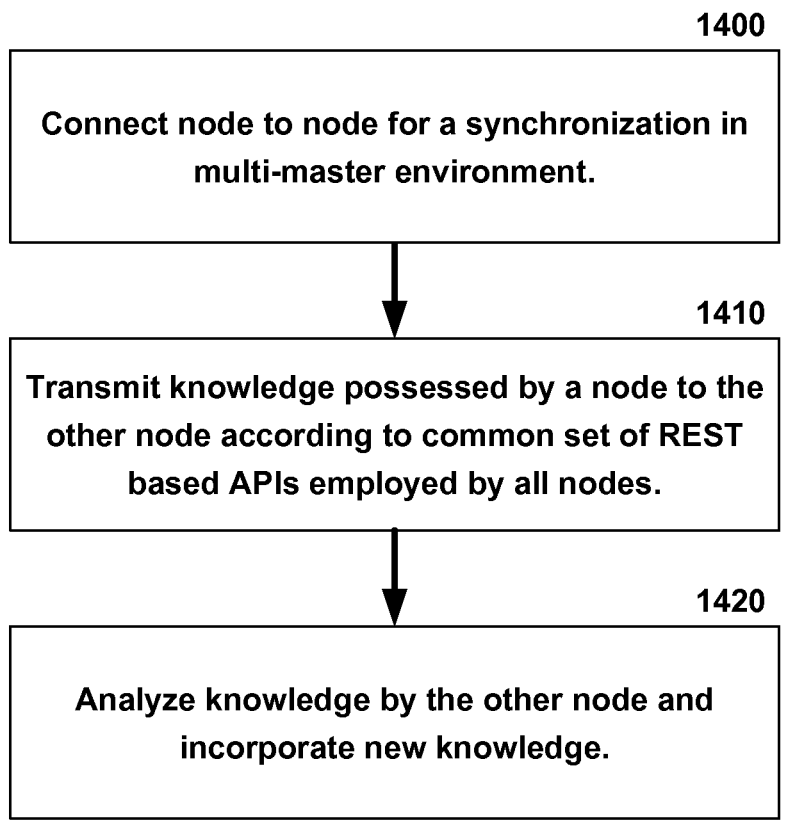
FIG. 14 is a second flow diagram illustrating an exemplary, non-limiting process for synchronizing in a multi-master synchronization environment via a set of REST based APIs.

FIG. 14 is another flow diagram illustrating an exemplary, non-limiting process for synchronizing in a multi-master synchronization environment via a set of REST based APIs. At 1400, a first node connects to a second node to perform synchronization in a multi-master environment, or is already connected. At 1410, knowledge possessed by the first node is transmitted to the second node according to a common set of REST based APIs employed by all nodes. At 1420, the knowledge is examined by the second node, and new knowledge is incorporated. The second node can also send changes to the first node of which the first node is not aware based on a similar analysis of knowledge from the first node.

Figure 15:
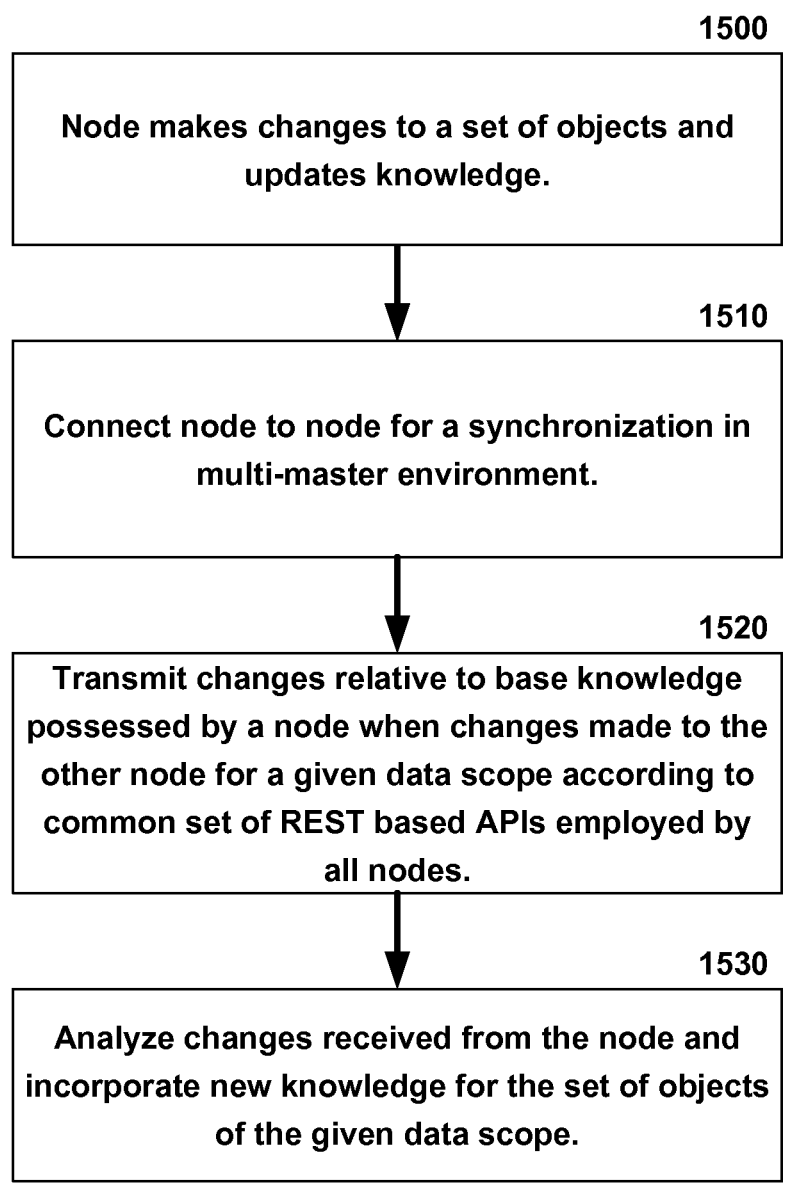
FIG. 15 is a third flow diagram illustrating an exemplary, non-limiting process for synchronizing in a multi-master synchronization environment via a set of REST based APIs.

FIG. 15 is another flow diagram illustrating an exemplary, non-limiting process for synchronizing in a multi-master synchronization environment via a set of REST based APIs. At 1500, a node makes changes to a set of objects and updates knowledge. At 1510, the node connects to another node for synchronization in a multi-master environment. At 1520, changes are transmitted to the other node for a given data scope relative to base knowledge possessed by the node when the changes were made according to common set of REST based APIs employed by all nodes. At 1530, the changes received from the node are analyzed by the other node and any new knowledge for the set of objects of the given data scope represented by the changes is incorporated. For items affected by the changes, the other node can also identify changes to send to the node based on an analysis of the changes received from the node.

In addition, partially-completed work can be supported due to the maintenance of the local copy, e.g., local copy of incomplete orders, in-progress workflows, etc. Each revision to the partially-completed work becomes a change to the underlying objects that is reflected by the efficient synchronization framework for describing synchronization knowledge.

As mentioned, a significant amount of flexibility is realized by the flexible multi-master synchronization capabilities described in various non-limiting embodiments. For instance, some off-line RIA scenarios enabled include "read-only offline data," "non-shared editable offline store," "shared editable offline store," and "customer relationship management."

For an example of a read-only offline data scenario, a "Read-Only Offline Calendar" can be implemented where a cached client calendar data gets updates from server. This would encompass a simple scenario for a single user's personal data. However, using the synchronization capabilities between a local client store and a server store, an "Editable Offline Calendar" can also be provided as an example of a non-shared editable offline store, where cached calendar data gets edited offline, and then the changes are synced to server. This would work well for a single user's personal data as well, where changing the data on the client side has benefits.

For a more complex example, one can also imagine a "Shared Offline Calendar" as an example of a shared editable offline store, where many people are able to edit the same calendar data. While making conflicts more likely, the knowledge framework has the ability to resolve conflicts. In this regard, multiple users can thus share and edit personal data. Yet another example is customer relationship management "CRM." For instance, employees of varying access levels can edit different sets of customer information, e.g., business users' corporate data.

Three application programming models that can each be implemented consistent with the synchronization knowledge framework include cache assisted applications, offline always (or occasionally connected) applications, and server-emulation applications. Cache-assisted applications operate online and can use a local store opportunistically to enhance performance. Offline-always (OCS-style) applications operate on the local cache and synchronize the cache with the server in the background. While a cache is used, the cache enables seamless online and offline transitions. Server-emulation applications provide a local layer that emulates server operations on the cache. The rest of the application is the same with or without cache.

For offline RIAs, applications can be deployed as a separate application, e.g., one-click installed application, an occasionally connected system application, or as an in-browser, but offline application. With respect to the RIA Client data store, the local store can support structured and unstructured data (files). In this regard, isolated storage is good for unstructured data, whereas relational storage is good for structured data. Both can be used effectively.

In non-limiting implementation, web services frameworks, such as ADO.NET, and other network data services enable services and applications to expose data as a service for web clients. In one implementation, the data service can be reached via HTTP and supports multiple payload formats such as JSON, XML, and others. Not only does the synchronization mechanism and extensions to the protocol enable efficient change enumeration for reduced traffic over the wire, but also helps in detecting conflicts, identifying what to send to clients, etc.

Integrating synchronization into web services as described herein includes a set of APIs designed that are effectively the minimum bar for making a service expose its data in a multi-master fashion. Other richer functionality can be built on top of the minimum set of APIs using the commands as a set of fundamental synchronization primitives to understand knowledge, or changes relative to set of particular knowledge and how to incorporate such knowledge, or changes into a local understanding or represent such knowledge, or changes to other nodes.

The payloads of the set of common methods can be defined according to any payload format. In one implementation, JavaScript Object Notation (JSON) is used as a payload format, though other payload formats such as XML can be used. Also, some implementation specific .NET classes are provided which can be used by an application to interact interoperably with the synchronization infrastructure. JSON is a lightweight computer data interchange format. It is a text-based, human-readable format for representing simple data structures and associative arrays, called objects. The JSON format is specified in RFC 4627.

The JSON format is often used for transmitting structured data over a network connection in a process called serialization. JSON is sometimes used as an alternative to the use of the XML format. JSON's basic types are: Number (integer, real, or floating point), String (double-quoted Unicode with backslash escapement), Boolean (true and false), Array (an ordered sequence of values, comma-separated and enclosed in square brackets), Object (collection of key/value pairs, comma-separated and enclosed in curly brackets) and null.

The following operations of Table I are a representative, non-limiting common set of methods that can be added to a network services layer and used by nodes in multi-master synchronization environment to share and propagate knowledge over HTTP using a REST programming model.

TABLE I

Set of REST based Methods Implemented by Infrastructure

| Method Name | Description | Input | Output |
| --- | --- | --- | --- |
| $sys_sync_getknowledge | Get Knowledge | Scope name | Server knowledge |
| $sys_sync_getchanges | Change enumeration | Scope name, base knowledge | Changes (i.e. ItemChange[ ]), LearnedKnowledge |
| $sys_sync_applychange | Change application - apply a change | Scope name, entity change, made with knowledge | Server copy of entity |

TABLE I-continued

Set of REST based Methods Implemented by Infrastructure

| Method Name | Description | Input | Output |
|---|---|---|---|
| $sys_sync_learnknowledge | Change application - add knowledge to server knowledge | Knowledge to learn | New server knowledge |

As an initial matter, though the examples below are in JSON format, data exchange can be performed in any format supported by the service. For a get changes request, clients issue a request for changes for a given data scope, providing their own knowledge for optimal change enumeration, for example as follows:

```
GetChanges Request
{
    _syncMetadata: {
        ScopeName: "MyScope",
        Knowledge: {
            ReplicaKeyMap: [
                { ReplicaId: "ClientReplica" }
            ],
            Scope: [
                { ReplicaKey: 0, TickCount: 1 }
            ]
        }
    }
}
```

For a corresponding get changes response, the response contains the server knowledge used for client side conflict detection as well as the batch of requested changes sent to the client, for example as follows, where beverages have changed to soft drinks, coffees, teas, beers, and ales In the below example, for instance, condiments have changed to sweet and savory sauces, relishes, spreads and seasonings:

```
GetChanges Response
[
    {
        _syncMetadata: {
            ReplicaId: "MyScope",
            Knowledge: {
                ReplicaKeyMap: [
                    { ReplicaId: "MyScope" },
                    { ReplicaId: "ClientReplica" }
                ],
                Scope: [
                    { ReplicaKey: 0, TickCount: 2125 }
                ]
            }
        }
    },
    {
        _metadata: {
            Type: "Categories",
            GlobalId: "Categories[1]",
            CreationReplicaKey: 0,
            CreationTickCount: 2040,
            LastUpdateReplicaKey: 0,
            LastUpdateTickCount: 2040,
            IsDeleted: false
        },
        CategoryID: 1,
        CategoryName: "Beverages",
        Description: "Soft drinks, coffees, teas, beers, and ales"
    },
    {
        _metadata: {
```

-continued

```
            Type: "Categories",
            GlobalId: "Categories[2]",
            CreationReplicaKey: 0,
            CreationTickCount: 2041,
            LastUpdateReplicaKey: 0,
            LastUpdateTickCount: 2041,
            IsDeleted: false
        },
        CategoryID: 2,
        CategoryName: "Condiments",
        Description: "Sweet and savory sauces, relishes, spreads, and seasonings"
    }
]
```

For an apply change request, the response contains the server knowledge used for client side conflict detection as well as the batch of requested changes. The apply change request applies a single entity change to the service providing the knowledge of the client (to be used in server side conflict detection scenarios) along with all associated knowledge metadata to describe item level changes. A sample apply change request is as follows:

```
ApplyChange Request
{
    _syncMetadata: {
        ScopeName: "MyScope2",
        Knowledge: {
            ReplicaKeyMap: [
                { ReplicaId: "ClientReplica" },
                { ReplicaId: "MyScope2" }
            ],
            Scope: [
                { ReplicaKey: 0, TickCount: 6 },
                { ReplicaKey: 1, TickCount: 2125 }
            ]
        },
        Type: "Products",
        ReplicaId: "ClientReplica",
        GlobalId: "Products[10]",
        CreationReplicaKey: 1,
        CreationTickCount: 2060,
        LastUpdateReplicaKey: 0,
        LastUpdateTickCount: 5,
        LastUpdateTickCount: 5,
        IsDeleted: false
    },
    UnitsOnOrder: 0,
    ProductName: "Ikura",
    ReorderLevel: 0,
    Discontinued: false,
    QuantityPerUnit: "12 - 200 ml jars",
    UnitPrice: 31,
    ProductID: 10,
    UnitsInStock: 32
}
```

Changes are ordered by the client and applied one at a time to the server. Clients are responsible for the resolution of conflicts while the server detects them accurately. In the response, the old server side state of the object is returned, which can be used for error processing. A sample apply change response is as follows:

```
ApplyChange Response
{
    __metadata: {
        Type: "Products",
        Base: "http://localhost:4996/WebSite2/WebDataService.svc",
        Uri: "Products[10]"
    },
    Categories: {
        __metadata: { Uri: "Products[10]/Categories" }
    },
    Discontinued: false, Order_Details: {
        __metadata: {
            Uri: "Products[10]/Order_Details"
        }
    },
    ProductID: 10,
    ProductName: "Ikura",
    QuantityPerUnit: "12 - 200 ml jars",
    ReorderLevel: 0,
    Suppliers: {
        __metadata: { Uri: "Products[10]/Suppliers" }
    },
    UnitPrice: 31,
    UnitsInStock: 32,
    UnitsOnOrder: 0
}
```

The get knowledge request method is used to obtain the service side knowledge for a given scope in order to determine what changes the client should send to the server, with an example, as follows:

```
GetKnowledge Request
{
    __syncMetadata: {ScopeName: "MyScope"}
}
```

The get knowledge response returns the service side knowledge to the client within the given scope, as follows:

```
GetKnowledge Response
{
    __syncMetadata:
    {
        ScopeName: "MyScope",
        Knowledge:
        {
            ReplicaKeyMap: [{ReplicaId: "replicaA" }],
            Scope: [{ReplicaKey: 0, TickCount: 1}]
        }
    }
}
```

With a learn knowledge request command, following the application of changes to the server, clients can sends their knowledge for the server to learn, so that clients can learn the changes applied to the server.

```
LearnKnowledge Request
{
    __syncMetadata:
    {
        ScopeName: "MyScope",
        Knowledge:
        {
            ReplicaKeyMap: [{ReplicaId: "replicaA" }],
            Scope: [{ReplicaKey: 0, TickCount: 1}]
        }
    }
}
```

Exceptions in the knowledge are effectively cleaned out by the server analysis concerning what knowledge to send to the client in response, for example, as follows:

```
LearnKnowledge Response
{
    __syncMetadata:
    {
        ScopeName: "MyScope",
        Knowledge:
        {
            ReplicaKeyMap: [ {ReplicaId: "replicaA" },
                             {ReplicaId: "replicaB"}],
            Scope: [   {ReplicaKey: 0, TickCount: 1},
                       {ReplicaKey: 2, TickCount: 2}]
        }
    }
}
```

In another non-limiting implementation, a sync provider component is provided can include a managed client library to help applications written using a managed code framework, such as the .NET Framework. Accordingly, sync classes can be defined and added to the library to help with writing sync applications, e.g., rich offline applications. In one implementation, the following 2 classes are added to a Client.Sync namespace for .NET: a Web Data Sync class and a Sync Item class, as follows:

```
public class WebDataSync
{
public WebDataSync(WebDataContext context, string syncScope);
    public Knowledge GetKnowledge( );
    public void GetChanges(
            Knowledge baseKnowledge,
            out List<SyncItem> changeList,
            out Knowledge learnedKnowledge);
    public bool ApplyChange(
            SyncItem change,
            Knowledge madeWithKnowledge);
    public bool LearnKnowledge(Knowledge knowledgeToLearn);
}
```

```
public class SyncItem
{
    public SyncItem(
            ItemChange itemChange,
            string typeName,
            Dictionary<string, object> changeData);;
    public ItemChange ItemChange
    {
      get;
    }
    public string TypeName
    {
      get;
    }
    public Dictionary<string, object> ChangeData
    {
      get;
    }
}
```

Figure 16:
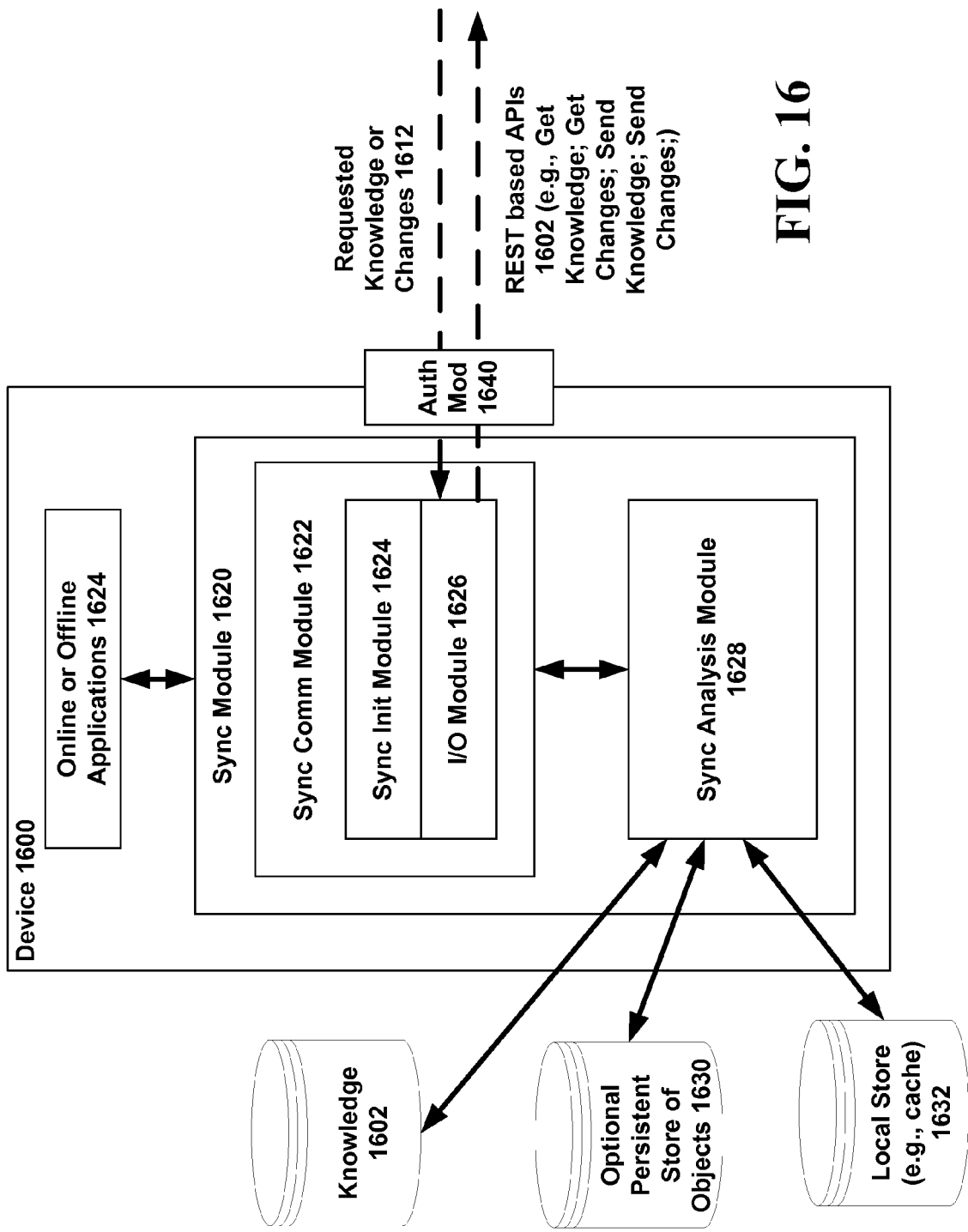
FIG. 16 is a block diagram of an exemplary non-limiting implementation of a device for performing a knowledge exchange with another node via a common set of REST APIs.

FIG. 16 is a block diagram of an exemplary non-limiting implementation of a device 1600 for performing a full or partial knowledge exchange via the set of RESTful APIs 1602 described herein. As shown, device 1600 includes a sync module 1620 that performs knowledge exchange techniques for synchronizing a set of objects 1630 with another device in accordance with non-limiting embodiments. The set of objects 1630 can also be stored in a cache 1632 as described elsewhere for efficient operations, and then set of objects 1630 can be later updated by the offline application 1624. Sync module 1620 may include a sync communications module 1622 for generally transmitting and receiving data in accordance with knowledge exchange techniques to and from other nodes as described herein.

Sync communications module 1622 may also include a sync initiation module 1624 which may initiate synchronization with a second device if authorized, e.g., via optional authorization module 1640, and connect to the second device. Sync module 1622 may also include an I/O module 1626 responsive to the initiation of synchronization by sending full and/or partial knowledge about the set of objects 1630 to a second device via REST based APIs 1602, e.g., for getting or sending knowledge or for getting or sending changes. Similarly, I/O module 1626 can receive requested knowledge or changes 1612 of the second device and changes to be made to the set of objects 1630 originating from the second device. In turn, a sync analysis module 1628 operates to apply any changes to be made to the set of objects 1630 and to compare knowledge 1612 received from the second device with the knowledge 1604 of the first device in order to determine changes to be made locally or to send to the second device to complete synchronization between the devices.

Exemplary Networked and Distrubuted Environments

One of ordinary skill in the art can appreciate that the various embodiments of the synchronization infrastructure described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may use the synchronization infrastructure as described for various embodiments of the subject disclosure.

Figure 17:
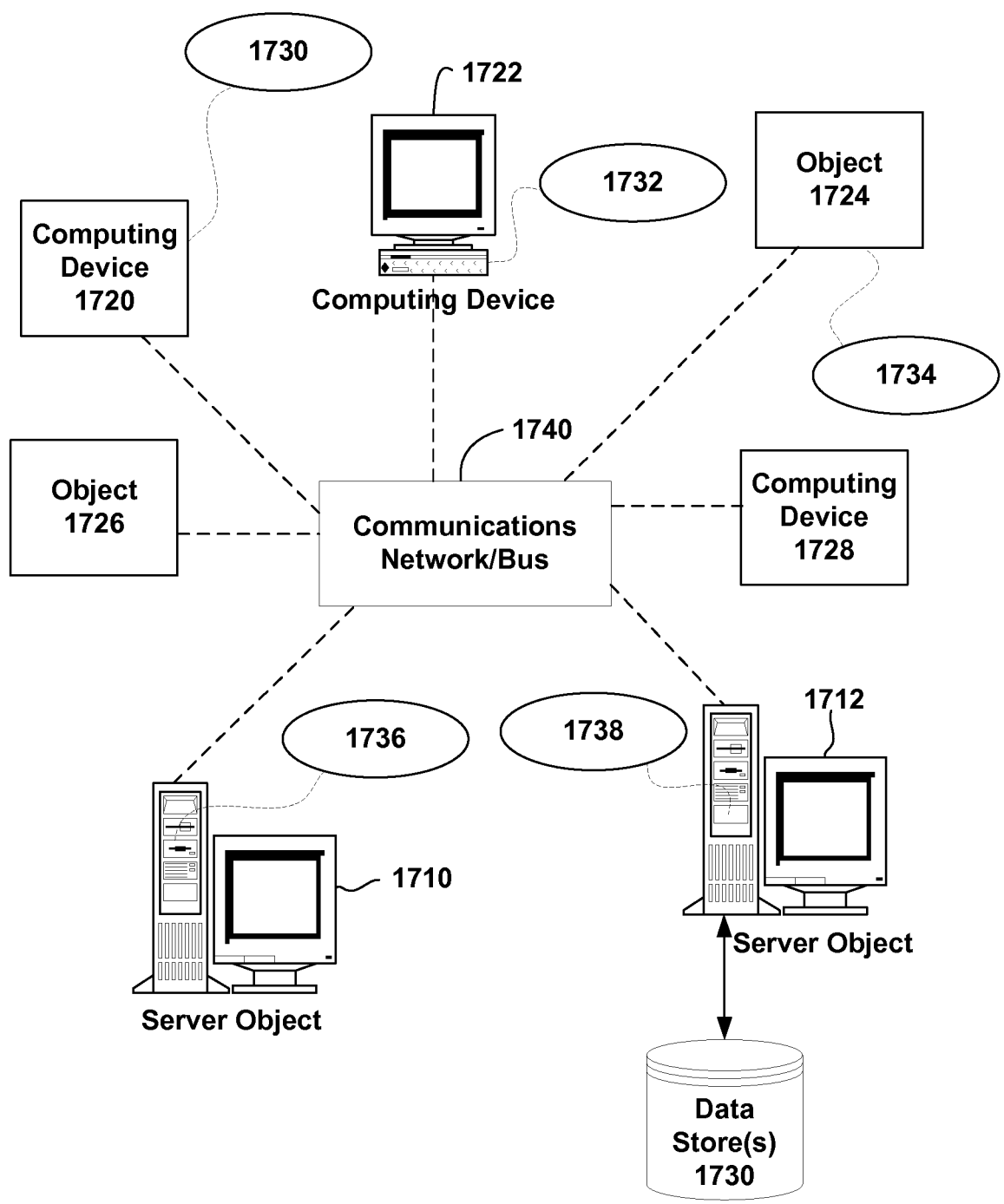
FIG. 17 is a block diagram representing exemplary non-limiting networked environments in which various embodiments described herein can be implemented.

FIG. 17 provides a schematic diagram of an exemplary networked or distributed computing environment. The distributed computing environment comprises computing objects 1710, 1712, etc. and computing objects or devices 1720, 1722, 1724, 1726, 1728, etc., which may include programs, methods, data stores, programmable logic, etc., as represented by applications 1730, 1732, 1734, 1736, 1738. It can be appreciated that objects 1710, 1712, etc. and computing objects or devices 1720, 1722, 1724, 1726, 1728, etc. may comprise different devices, such as PDAs, audio/video devices, mobile phones, MP3 players, personal computers, laptops, etc.

Each object 1710, 1712, etc. and computing objects or devices 1720, 1722, 1724, 1726, 1728, etc. can communicate with one or more other objects 1710, 1712, etc. and computing objects or devices 1720, 1722, 1724, 1726, 1728, etc. by way of the communications network 1740, either directly or indirectly. Even though illustrated as a single element in FIG. 17, network 1740 may comprise other computing objects and computing devices that provide services to the system of FIG. 17, and/or may represent multiple interconnected networks, which are not shown. Each object 1710, 1712, etc. or 1720, 1722, 1724, 1726, 1728, etc. can also contain an application, such as applications 1730, 1732, 1734, 1736, 1738, that might make use of an API, or other object, software, firmware and/or hardware, suitable for communication with or implementation of the synchronization infrastructure provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the synchronization infrastructure as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 17, as a non-limiting example, computers 1720, 1722, 1724, 1726, 1728, etc. can be thought of as clients and computers 1710, 1712, etc. can be thought of as servers where servers 1710, 1712, etc. provide data services, such as receiving data from client computers 1720, 1722, 1724, 1726, 1728, etc., storing of data, processing of data, transmitting data to client computers 1720, 1722, 1724, 1726, 1728, etc., although any computer can be considered a client, a server, or both, depending on the circumstances. Any of these computing devices may be processing data, synchronizing or requesting services or tasks that may implicate the synchronization infrastructure as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the synchronization infrastructure can be provided standalone, or distributed across multiple computing devices or objects.

In a network environment in which the communications network/bus 1740 is the Internet, for example, the servers 1710, 1712, etc. can be Web servers with which the clients 1720, 1722, 1724, 1726, 1728, etc. communicate via any of a number of known protocols, such as the hypertext transfer protocol (HTTP). Servers 1710, 1712, etc. may also serve as clients 1720, 1722, 1724, 1726, 1728, etc., as may be characteristic of a distributed computing environment.

Exemplary Computing Device

As mentioned, advantageously, the techniques described herein can be applied to any device where it is desirable to synchronize with other objects in a computing system. It should be understood, therefore, that handheld, portable and other computing devices and computing objects of all kinds are contemplated for use in connection with the various embodiments, i.e., anywhere that a device may synchronize. Accordingly, the below general purpose remote computer described below in FIG. 18 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 18:
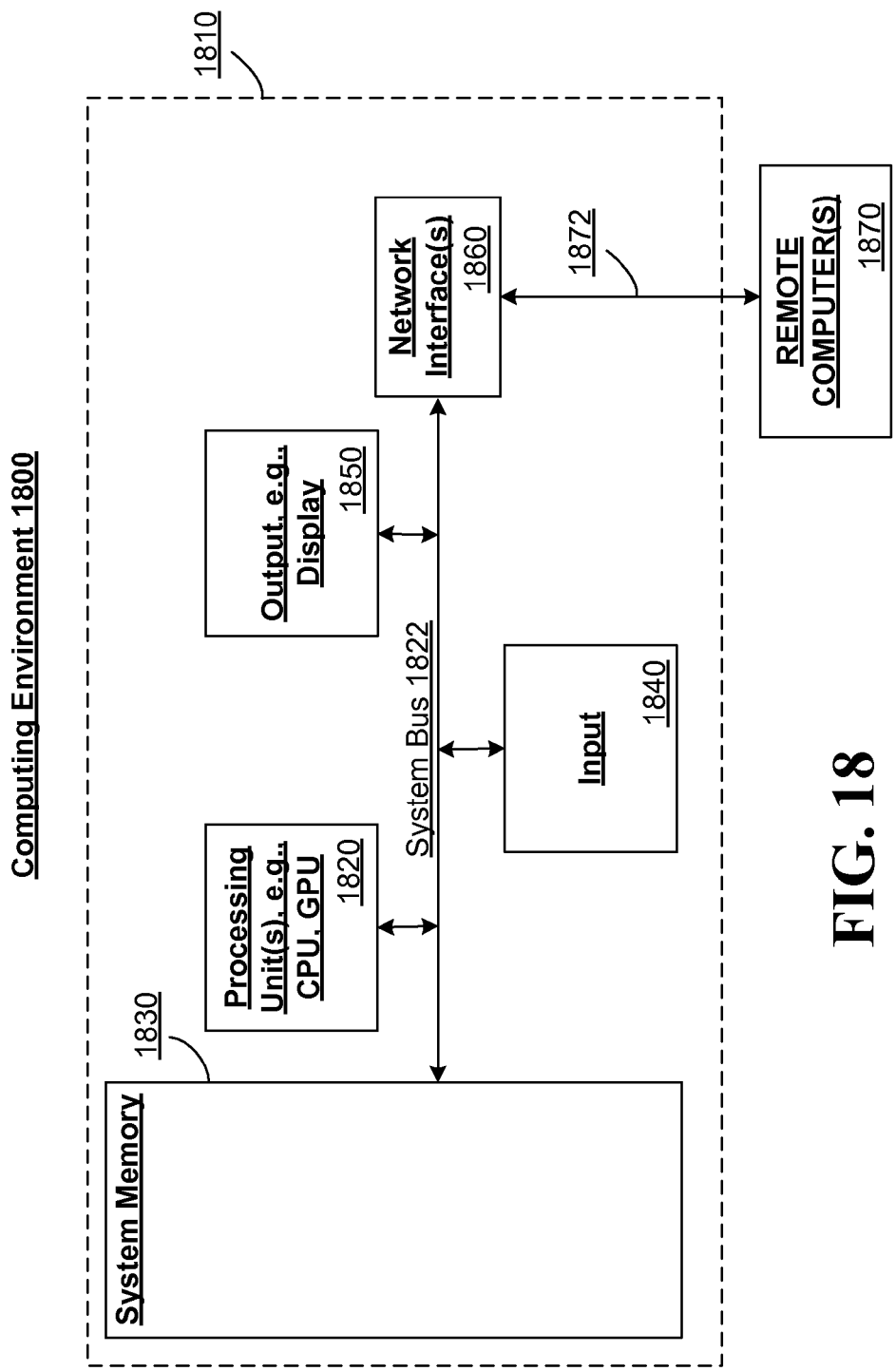
FIG. 18 is a block diagram representing an exemplary non-limiting computing system or operating environment in which one or more aspects of various embodiments described herein can be implemented.

FIG. 18 thus illustrates an example of a suitable computing system environment 1800 in which one or aspects of the embodiments described herein can be implemented, although as made clear above, the computing system environment 1800 is only one example of a suitable computing environment and is not intended to suggest any limitation as to scope of use or functionality. Neither should the computing environment 1800 be interpreted as having any dependency or requirement relating to any one or combination of components illustrated in the exemplary operating environment 1800.

With reference to FIG. 18, an exemplary remote device for implementing one or more embodiments includes a general purpose computing device in the form of a computer 1810. Components of computer 1810 may include, but are not limited to, a processing unit 1820, a system memory 1830, and a system bus 1822 that couples various system components including the system memory to the processing unit 1820.

Computer 1810 typically includes a variety of computer readable media and can be any available media that can be accessed by computer 1810. The system memory 1830 may include computer storage media in the form of volatile and/or nonvolatile memory such as read only memory (ROM) and/or random access memory (RAM). By way of example, and not limitation, memory 1830 may also include an operating system, application programs, other program modules, and program data.

A user can enter commands and information into the computer 1810 through input devices 1840. A monitor or other type of display device is also connected to the system bus 1822 via an interface, such as output interface 1850. In addition to a monitor, computers can also include other peripheral output devices such as speakers and a printer, which may be connected through output interface 1850.

The computer 1810 may operate in a networked or distributed environment using logical connections to one or more other remote computers, such as remote computer 1870. The remote computer 1870 may be a personal computer, a server, a router, a network PC, a peer device or other common network node, or any other remote media consumption or transmission device, and may include any or all of the elements described above relative to the computer 1810. The logical connections depicted in FIG. 18 include a network 1872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to synchronize.

Also, there are multiple ways to implement the same or similar functionality, e.g., an appropriate API, tool kit, driver code, operating system, control, standalone or downloadable software object, etc. which enables applications and services to use the synchronization infrastructure. Thus, embodiments herein are contemplated from the standpoint of an API (or other software object), as well as from a software or hardware object that provides synchronization capabilities. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment or set of embodiments, but rather should be construed in breadth, spirit and scope in accordance with the appended claims.

What is claimed is:

1. A computer-implemented method of synchronizing a set of objects, the computer-implemented method comprising:
    synchronizing the set of objects within a data scope in a multi-master synchronization network environment between a node of a plurality of nodes and a synchronization engine based, at least, on knowledge of the set of objects represented independent of object data type, with knowledge including versioning information for the objects of the set of objects by:
        storing an updated set of objects and updated knowledge of the set of objects including corresponding updated versioning information in a store of the node;
        changing one or more objects of the updated set of objects via an offline application of the node;
        updating the knowledge of the node corresponding to the changes made in the, one or more objects and the versioning information for the set of objects; and
    at a time determined by the offline application, and based at least in part on a condition predefined by the offline application, formatting a payload representing updated knowledge of the updated set of objects in a payload format including JavaScript Object Notation (JSON);
    transmitting the formatted payload to the synchronization engine; and
    employing a Representational State Transfer (REST)-based component to communicate, at least in part, by transferring a representation of a resource in a format matching one of a set of standard data types, selected dynamically based on at least one of a capability of a recipient or a nature of the resource.

2. The computer-implemented method of claim 1, further comprising transmitting, to the synchronization engine, information about the changes made in the one or more objects of the updated set of objects, and the base knowledge possessed by the node prior to the changing.

3. The computer-implemented method of claim 1, wherein the storing includes caching the updated set of objects and updated knowledge of the set of objects in a local cache memory.

4. The computer-implemented method of claim 1, further comprising, synchronizing by the node with a second node based, at least, on an analysis of respective knowledge of the set of objects within the given data scope possessed by the node and the second node, and updating the knowledge of the node, including updating the versioning information.

5. The computer-implemented method of claim 4, wherein the synchronizing with the second node is performed via one or more commands of the standard network synchronization interface.

6. The computer-implemented method of claim 1, wherein the predefined condition comprises at least one of a threshold number of changes, a threshold batch size for changes or a threshold time span.

7. The computer-implemented method of claim 1, wherein the payload format includes other language independent formats that are comparable to JSON.

8. The computer-implemented method of claim 1, wherein the updated set of objects and updated knowledge of the set of objects is based, at least in part, upon synchronization, by the synchronization engine, with a store maintained by a web service to obtain latest knowledge of the set of objects within the data scope possessed by the web service.

9. The computer-implemented method of claim 1, further comprising:
    synchronizing, by the node, with the synchronization engine to obtain the updated object information from the synchronization engine, wherein the updated object information is associated with the plurality of objects.

10. A node of a plurality of nodes connected via one or more networks to synchronize a set of objects between a first node and any other node of a plurality of nodes of a multi-master synchronization environment, the node comprising:
    a processor;
    a synchronization component configured to synchronize the set of objects between a first node and a second node of the plurality of nodes, the synchronization component including:
        a synchronization communications component configured to initiate synchronization with the second node via a set of common Representational State Transfer (REST) based methods, using a synchronization metadata structure that is independent of data type, wherein the REST based methods include a method of getting knowledge from the second node, a method of sending knowledge to the second node, a method of getting changes from the second node, and a method of sending changes to the second node for knowledge exchange between the second node and the first node, wherein the sending knowledge to the second note and the sending of changes to the second node include formatting a payload representing knowledge in a payload format including JavaScript Object Notation (JSON); and a synchronization analysis component configured to update local knowledge of the set of objects represented on the node and corresponding object versioning information by comparing external knowledge of the set of objects and corresponding versioning information received from the second node with the local knowledge of the set of objects and corresponding node object versioning information to determine changes to be reflected by revised local knowledge of the set of objects and corresponding object versioning information; and a computer-readable storage medium storing instructions that, when executed by the processor, cause the processor to implement at least one of the synchronization analysis component or the synchronization communications component.

11. The node of claim 10, further comprising cache storage configured to store a copy of the local knowledge of the set of objects.

12. The node of claim 10, wherein the payload format includes other language independent formats that are comparable to JSON.

13. A computer-implemented method comprising:

performing multi-master synchronization of a set of objects between a node of a plurality of nodes and a network services data synchronization node of the plurality of nodes, wherein the nodes are configured to communicate via one or more networks when connected, and wherein the network services data synchronization node is configured to provide data synchronization processing and handling on behalf of a plurality of network service nodes according to a knowledge framework for efficiently defining synchronization metadata by:

receiving, by the network services data synchronization node from a requesting node of the plurality of nodes, a request for knowledge of a set of objects within a given data scope to be learned by the requesting node, wherein the receiving includes receiving one or more commands according to a set of standardized Representational State Transfer (REST) based interfaces configured to communicate synchronization information among the plurality of nodes, and wherein knowledge of the set of objects is defined independently of object data type, wherein the receiving one or more commands according to a set of REST based interfaces includes receiving one or more commands that include data representing base knowledge of the set of objects possessed by the node for requesting changes differing from the base knowledge from the network services synchronization node, wherein changes are identified by version identifiers; and transmitting knowledge of the set of objects for the given data scope possessed by the network services data synchronization node to the requesting node via the set of standardized REST based interfaces, wherein the transmitting includes formatting a payload representing knowledge in a payload format including JavaScript Object Notation (JSON).

14. The computer-implemented method of claim 13, wherein the receiving one or more commands according to a set of REST based interfaces configured to communicate synchronization information includes receiving hypertext transfer protocol (HTTP) commands.

15. The computer-implemented method of claim 13, wherein the receiving one or more commands according to a set of REST based interfaces includes receiving a get knowledge command, which defines the given data scope, for requesting knowledge from the network services data synchronization node.

16. The computer-implemented method of claim 15 further comprising, outputting the requested knowledge from the network services data synchronization node based, at least, on the receiving the get knowledge command.

17. The computer-implemented method of claim 13, wherein the one or more commands includes a get changes command.

18. The computer-implemented method of claim 17, further comprising, outputting the changes that differ from the base knowledge of the node based, at least, on the receiving the get changes command.

19. The computer-implemented method of claim 13, wherein the payload format includes other language independent formats that are comparable to JSON.

* * * * *